US006970547B2

(12) United States Patent
Andrews et al.

(10) Patent No.: US 6,970,547 B2
(45) Date of Patent: Nov. 29, 2005

(54) UNIVERSAL STATE-AWARE COMMUNICATIONS

(75) Inventors: Wayne Andrews, Naples, FL (US); Jerry Gechter, Lincoln, MA (US)

(73) Assignee: OnState Communications Corporation, Lincoln, MA (US)

( * ) Notice: Subject to any disclaimer, the term of this patent is extended or adjusted under 35 U.S.C. 154(b) by 50 days.

(21) Appl. No.: 10/436,546

(22) Filed: May 12, 2003

(65) Prior Publication Data

US 2004/0228469 A1 Nov. 18, 2004

(51) Int. Cl.[7] .............................................. H04M 3/42
(52) U.S. Cl. ......................... 379/210.01; 379/215.01; 379/201.01
(58) Field of Search ..................... 379/93.01, 106.01, 379/93.23, 265.01, 266.1; 709/204, 205, 709/206

(56) References Cited

U.S. PATENT DOCUMENTS

| | | | |
|---|---|---|---|
| 5,526,524 A | 6/1996 | Madduri ..................... 395/726 |
| 5,533,109 A | 7/1996 | Baker .......................... 379/201 |
| 5,546,455 A | 8/1996 | Joyce et al. ................ 379/265 |
| 5,577,111 A | 11/1996 | Iida et al. ................... 379/209 |
| 5,586,178 A | 12/1996 | Koenig et al. .............. 379/265 |
| 5,778,060 A | 7/1998 | Otto ............................ 379/265 |
| 5,784,561 A | 7/1998 | Bruno et al. ........... 395/200.34 |
| 5,812,551 A | 9/1998 | Tsukazoe et al. ........... 379/399 |
| 5,825,869 A | 10/1998 | Brooks et al. .............. 379/265 |
| 5,857,018 A | 1/1999 | Sumner et al. ............. 379/266 |
| 5,884,032 A | 3/1999 | Bateman et al. ....... 395/200.34 |
| 5,910,983 A * | 6/1999 | Dezonno et al. ....... 379/266.04 |
| 5,946,386 A * | 8/1999 | Rogers et al. ......... 379/265.09 |
| 5,946,388 A | 8/1999 | Walker et al. .............. 379/266 |
| 5,970,132 A | 10/1999 | Brady ......................... 379/212 |
| 5,970,134 A | 10/1999 | Highland et al. ........... 379/265 |
| 5,978,463 A | 11/1999 | Jurkevics et al. ........... 379/202 |
| 5,990,933 A | 11/1999 | Ozone et al. .................. 348/15 |
| 5,991,390 A | 11/1999 | Booton ........................ 379/265 |
| 5,991,394 A | 11/1999 | Dezonno et al. ............ 379/265 |
| 5,995,594 A | 11/1999 | Shaffer et al. ............ 379/88.12 |
| 6,038,304 A | 3/2000 | Hart ............................ 379/202 |
| 6,122,364 A | 9/2000 | Petrunka et al. ............ 379/265 |
| 6,160,877 A * | 12/2000 | Tatchell et al. ............. 379/197 |
| 6,160,881 A | 12/2000 | Beyda et al. ................ 379/209 |
| 6,188,683 B1 | 2/2001 | Lang et al. .................. 370/352 |
| 6,282,284 B1 | 8/2001 | Dezonno et al. ............ 379/265 |
| 6,411,601 B1 | 6/2002 | Shaffer et al. .............. 370/230 |
| 6,411,805 B1 | 6/2002 | Becker et al. .............. 455/414 |
| 6,430,281 B1 | 8/2002 | Morley et al. .......... 379/210.01 |
| 6,438,216 B1 | 8/2002 | Aktas ....................... 379/88.01 |
| 6,501,750 B1 | 12/2002 | Shafer et al. ................ 370/352 |
| 6,546,087 B2 | 4/2003 | Shafer et al. ............ 379/90.01 |
| 6,658,095 B1 | 12/2003 | Yoakum, et al. |

(Continued)

OTHER PUBLICATIONS

Product Description, OpenScape, Siemens AG, Information and Communication Networks 2002, Munchen Germany.

(Continued)

*Primary Examiner*—Ahmad F. Matar
*Assistant Examiner*—Hector Agdeppa
(74) *Attorney, Agent, or Firm*—Hamilton, Brook, Smith & Reynolds, P.C.

(57) ABSTRACT

A communications system for general business environments that exploits knowledge of user state to provide advantages of efficiency and control for individual users and for the business. The communications system also provides particular advantages in environments where users have multiple communication devices and for communications of a business with external parties. In other aspects, the communication system provides features of application flexibility and system fault-tolerance with broad applicability to communication systems.

80 Claims, 35 Drawing Sheets

System Diagram

U.S. PATENT DOCUMENTS

| | | | |
|---|---|---|---|
| 2002/0065894 A1* | 5/2002 | Dalal et al. | 709/206 |
| 2002/0116461 A1* | 8/2002 | Diacakis et al. | 709/204 |
| 2002/0147777 A1* | 10/2002 | Hackbarth et al. | 709/205 |
| 2002/0163572 A1* | 11/2002 | Center et al. | 348/14.08 |
| 2003/0009530 A1 | 1/2003 | Philonenki, et al. | |
| 2003/0014491 A1* | 1/2003 | Horvitz et al. | 709/206 |
| 2003/0073440 A1* | 4/2003 | Mukherjee et al. | 455/435 |
| 2003/0154293 A1* | 8/2003 | Zmolek | 709/228 |
| 2003/0185360 A1* | 10/2003 | Moore et al. | 379/114.01 |
| 2003/0206619 A1 | 11/2003 | Curbow, et al. | |
| 2004/0057570 A1* | 3/2004 | Power et al. | 379/265.13 |
| 2004/0059781 A1* | 3/2004 | Yoakum et al. | 709/204 |
| 2004/0208308 A1* | 10/2004 | Mcgraw et al. | 379/265.02 |
| 2004/0225524 A1* | 11/2004 | Narasimhan et al. | 705/1 |

OTHER PUBLICATIONS

The Pint Service Protocol, Jun. 2000.

SIP: Session Initiation Protocol, Jun. 2002.

Session Inititation Protocol (SIP)-Specific Event Notification, Jun. 2002.

Session Initiation Protocol (SIP) Extension for Instant Message, Dec. 2002.

Product Description, Nortel Networks Succession Enterprise, 2002.

Product Description, *Siemens Announces Application Suite OpenScape For Real-Time Communication and Collaboration—New SIP-Based Solution for Productivity Revolution*, Siemens AG, Information and Communication Networks 2002, Munich, Germany.

Product Description, *Microsoft Releases Real-Time Communications Platform Beta Version*, Redmond, Washington, Mar. 5, 2003.

* cited by examiner

System Diagram

State Messages

- User State
  - User ID
  - Device ID
  - User state
  - User state data (if needed)
  - Activate/Inactivate
- Device State
  - Device ID
  - Device state
  - Activate/Inactivate

Fig. 3

State Notification

- To subscribe for notification
  - Viewuser
    - For user states
    - Specifies user on device
  - Viewdevice
    - For device states
    - Specifies device
- Subscription result
  - Establishes the watcher's interest in receiving info
  - Info determined by scripts handling user & device events

Fig. 4

Communication Request

- Calling User
- Called User
- Call info
    - Subject
    - Priority
    - Media
    - Context data
- Pending state info (if needed)

Fig. 5

Communications Status

- Calling User
- Called User
- Call info
  - Subject
  - Priority
  - Media
  - Context data
- Pending state info
- Device id
- Status
- Activate or deactivate

Fig. 6

Call Status Data

- Calling User ID
- Called User ID
- Call info
  - Subject
  - Priority
  - Media
  - Context data
- Pending state info (calling and called)
- Status
- Devices
- Pending Order
  - Calling User
  - Called User
  - Corporate
- History (Create & connect time)
- Deleted

Fig. 7

User Client Displays

User Client Displays

| Pending Calls | | | |
|---|---|---|---|
| Party Name, Subject, priority | Status | Delete | Update |
| Party Name, Subject, priority | Status | Delete | Update |
| Party Name, Subject, priority | Status | Delete | Update |
| Party Name, subject, priority | Status | Delete | Update |

| User | Corp phone | | PC | Mobile |
|---|---|---|---|---|
| John Smith | ☐ | ☐ | ☐ | ☐ |
| Ann Jones | ☐ | | ☐ | |
| Steve Ash | ☐ | Signedon Available | ☐ | ☐ |

| Calls by Start Time | | | | | |
|---|---|---|---|---|---|
| User1 | User2 | Call info | Start | Duration | Pend time |
| User1 | User2 | Call info | Start | Duration | Pend time |
| User1 | User2 | Call info | Start | Duration | Pend time |
| User1 | User2 | Call info | Start | Duration | Pend time |

User Client Initialization

Pended Call Execution

- User state change triggers state processing script
- Server identifies pending calls waiting for this user and state
- Pending calls are ordered based on Call Status Table entries (Fig. 7)
- Primary order based on Calling and Called user ordering
- Secondary order based on call priority and time pending
- Corporate override can be invoked based on corporate priority, directly or with a call evaluation object

Fig. 20

Pended Call Insertion

- Call Status info defines an item of communication work
- Inserted record is identified and treated as a pending call
- Communications status messages are sent as usual
- Call status can be monitored by all concerned parties
- Database permissions determine scope of insertions

Fig. 22

Other Interaction Interfaces

- Web Server
- Interactive Voice Response (IVR)
- Workflow
- Softphone
- Application-specific state sources

Fig. 23

Other Network Interfaces

- Circuit-switched & packet-switched
- Fixed and mobile
- TAPI/JTAPI
- CTI interfaces to PBX's and ACD's
- Text as well as streaming media
- Realtime and non-realtime (Email)

Fig. 24

Network Interworking

- Interworking with external communications clients
- Can include both communication services and state
- Supported by interworking clients
- Examples
    - Phone network (PSTN) gateway
    - Instant Messaging gateway
    - Pending calls triggered in the network
    - Integrated SIP proxy/redirect server

Fig. 25

Network Interworking--PSTN

UNIVERSAL STATE-AWARE COMMUNICATIONS

TECHNICAL FIELD

The invention relates to a system and method for establishing communications between users.

BACKGROUND

Communications systems arose as mechanisms to connect individual telephones to each other. Users dialed phone numbers and were connected through a network to other telephones associated with those numbers. This is still the primary mode of interaction in telecommunication systems in both public and private networks. For a business, this form of telecommunications function is typically provided by a Private Branch Exchange (PBX) on company premises or by a Centrex system offered by a telephone company. In a PBX or Centrex system the system is aware of the "state" of telephone lines rather than the state of the individuals (referred to as "users" herein) and is typically limited to the busy and idle line states.

Other types of telecommunications systems do exist but are specialized in their applications. Of particular importance is the Automatic Call Distributor (ACD) which is used, for example, in an airline reservation bureau to keep a caller on hold until an appropriate agent is ready to take the call. In these systems, a person dialing in is one type of user, and the agents are another. As opposed to the PBX, these systems route calls with respect to identified people (i.e., the next available agent), and not just telephone lines and numbers, and they do so using a concept of state that reflects what the agent is doing, not just whether the agent's phone is busy. However, the states are specific to the call center environment, and the communications role is restricted to dequeuing based on target user state. While ACDs cost significantly more than PBXs to install, the efficiency gains provided by state-dependent routing justify the increased expense.

Another form of communication often packaged with an ACD is a callback system. With these systems a party can request a callback according to a schedule. In this case a communication is established according to the schedule and availability of agents for callback work. Callback requests can be placed by phone or other means including the internet.

Instant messaging systems offered by America On-Line and Microsoft are a different type of communication system that has been developed recently and used widely. With an Instant Messaging client application, a user can set his own state to one of a discrete number of values (For Microsoft: On-line, Busy, Be Right Back, Away, On the Phone, Out to Lunch, Appear Off-line), and these values will be delivered to others who have signed up with the system to receive them. The system also enables the user to control who is allowed to observe him. The state information is used primarily by individuals who want to know if their friends and colleagues are on-line, so that they can be contacted. There is currently an international standards activity in the Internet Engineering Task Force (IETF) to produce uniform protocols for these state delivery systems.

SUMMARY

In one aspect the invention provides a system for establishing communications between users, including one or more communication devices for each user and a controller that continually monitors the states of the users. The controller also receives requests to establish communications between two or more of the users, and establishes a requested communication when the users are each in an appropriate state for participating in the communication.

In particular instances the invention may include one or more of the following features. Communication requests may include specification of the appropriate state for one or more of the users. Monitoring the states of users may be done by receiving state change messages or by polling state data for the users. A call status interface may be included in the controller to provide external management of communication requests that are waiting to be established. External management may be performed by a user, a person who is not a user, or a computer application process. The call status interface may provide information about communication requests, including the length of time a communication request has spent waiting to be established, and may include the capability to initiate, delete, or modify a communication request. The call status interface may have the capability to manage only the communications requests involving a particular user, the capability to set a user priority order for communication requests involving a particular user, or the capability to set a corporate priority order among the communication requests overall. Only some users and not others may be able to set a corporate priority order.

The controller may respond to a change of state for a user by determining that one or more requests for communication can be established and selecting a single communication to be established. The controller may respond to a change of state for a user by establishing a communication instead of sending user state information that would otherwise be sent. The controller may include a reporting interface with historical information including the duration of the pending time before a requested communication was established. Communication may involve a real-time communication medium such as voice or a non-real-time communication medium such as email. It may involve an Instant Messaging system or the Public Switched Telephone network. The state of a user may be monitored using an Instant Messaging system, a CRM system, a SIP network, a GPS system, a Web server or a Web service. The system may involve an external user whose communication devices are not connected to a communication network connected to the controller.

Additionally the call status interface may have the capability to manage incoming or outgoing communications, the capability to change a user in a communications request, or the capability to activate or deactivate a communication request. The controller may include a configuration interface with the capability to configure responses to communication events or state change requests or the capability to configure a call evaluation object that determines a corporate priority for a communication request. The configuration interface may be accessible by an individual user to configure call handling options for communication requests in which he is involved. The controller may include a state-setting interface and may send state information either spontaneously or in response to information requests. The controller may send communications status messages to inform users of communication requests. The call status interface, the configuration interface, and the state-setting interface may be accessed from a communication device or separately. Also, communication may use voice, video, text, or email and may involve a circuit-switched, packet-switched, public or private network. An external user may access the system using the Public Switched Telephone Network or Instant Messaging and may change his state using either Instant Message or a Web server. The system may include interworking clients that receive communications from outside networks including the Public Switched Telephone Network or the Internet. The system may preserve communication requests when it is restarted or may have a backup controller that receives state information from the controller and provides the function of the controller in case of failure.

In another aspect the invention enables a user to set conditions for his communication. The system again includes one or more communication devices for each user and a controller that continually monitors the states of the users. The controller also enables a user to set conditions under which communications are to be established with that user, receives requests to establish communications between two or more of the users, and establishes a requested communication according to the conditions set by the users and when the users are each in an appropriate state for participating in the communication.

In particular instances the controller may include a call status interface to provide external management of communication requests that are waiting to be established or a configuration interface for an individual user to configure call handling options for communication requests in which he is involved.

In another aspect the invention enables an administrator to set conditions for communications among users. The invention again provides a system for establishing communications between users, including one or more communication devices for each user and a controller that continually monitors the states of the users. In this aspect the system includes a system administrator, and the controller receives conditions under which communications are to be established among the users from the system administrator. The controller also receives requests to establish communications between two or more of the users, and establishes a requested communication according to the conditions set by the administrator and when the users are each in an appropriate state for participating in the communication.

In particular instances the invention may include one or more of the following features. The administrative conditions may be set for an individual communication request or set by priority rules configured by the administrator. The administrative conditions may involve assigning a corporate priority order to a communication request or changing the characteristics of a communication request. The administrative conditions may involve configuration of a call evaluation object which determines a corporate priority based on characteristics of a communication request. The administrative condition may be set using a call status interface to provide external management of communication requests that are waiting to be established. The administrator may or may not be a user.

In another aspect the invention provides a system for establishing communications among users involved in a project. In this aspect the controller continually monitors project states in addition to user states and establishes a requested communication among two or more users based upon the state of at least one of the two or more users and the project states. This enables the system to facilitate communications necessary to the success of the project.

In particular instances the invention may include one or more of the following features. The controller may respond to a change in project state by initiating a communication request, by establishing or changing a priority for a communication request, or by changing the state of a user. The controller may respond to a change in project state by modifying a communication request, deleting a communication request, deactivating a communication request so that it cannot be established, activating a deactivated communication request so that it can be established, or changing the users involved in a call request. The controller may establish a requested communication based on the states of all of the two or more users and the project states.

In another aspect the invention involves users having more than one communication device. In this aspect the controller establishes a requested communication when the users are each in an appropriate state on an appropriate device. This means that the controller can additionally impose conditions on the devices at which users can be reached for particular communications.

In particular instances the invention may include device selection logic to determine which user devices are appropriate for the requested communication based on the states of the users on their devices, the identities of the users, or the time of day or day of week.

In another aspect the invention provides a caller-state callback system including one or more communication devices for each user, one or more communication requesters, and a controller that continually monitors the states of the users. In this aspect the controller receives communication requests from the communication requesters, and establishes a requested communication between the requesting user and additional users when the requesting user is in an appropriate state. In this aspect a user can initiate a request to communicate with other users subject to his own availability to participate in the communication.

In particular instances the invention may include one or more of the following features. Communication requests may include specification of the appropriate state for one or more of the users. Monitoring the states of users may be done by receiving state change messages or by polling state data for the users. A call status interface may be included in the controller to provide external management of communication requests that are waiting to be established. External management may be performed by a user, a person who is not a user, or a computer application process. The call status interface may provide information about communication requests, including the length of time a communication request has spent waiting to be established, and may include the capability to initiate, delete, or modify a communication request. The call status interface may have the capability to manage only the communications requests involving a particular user, the capability to set a user priority order for communication requests involving a particular user, or the capability to set a corporate priority order among the communication requests overall. Only some users and not others may be able to set a corporate priority order.

The controller may respond to a change of state for a user by determining that one or more requests for communication can be established and selecting a single communication to be established. The controller may respond to a change of state for a user by establishing a communication instead of sending user state information that would otherwise be sent. The controller may include a reporting interface with historical information including the duration of the pending time before a requested communication was established. Communication may involve a real-time communication medium such as voice or a non-real-time communication medium such as email. It may involve an Instant Messaging system or the Public Switched Telephone network. The state of a user may be monitored using an Instant Messaging system, a CRM system, a SIP network, a GPS system, a Web server or a Web service. The system may involve an external user whose communication devices are not connected to a communication network connected to the controller.

In another aspect the invention provides a database-driven, stateful communication system. In this aspect the system involves one or more communication devices for each user and a controller that monitors the states of the users, receives communication requests, and accesses one or more database tables for configuration information. The database tables define the handling of communication and state events through the following items: one or more tables containing references to communication control operations, one or more tables containing links associating one communication control operation with a next one, one or more tables specifying an initial communication control operation to be performed in response to a communication request from a particular user, and one or more tables specifying an initial communication control operation to be performed in response to a change of state for a particular user.

In particular instances the communication control operations may include a make call operation that causes a communication to be offered to a user, a send state operation that causes a user state to be communicated to a user, or a pend call operation that causes a communication to wait for conditions to be satisfied before communication can be offered to a user. The conditions for the pend call operation may include an appropriate state for a user for the communication.

In another aspect the invention provides a fault-tolerant system for disseminating information about states of users and establishing communication between users. In this aspect the system includes one or more communication devices for each user, an active controller, and a backup controller. The active controller monitors the states of the users, receives communication requests, sends information about the states of the users, and establishes a requested communication when one of the users is in an appropriate state for participating. The backup controller receives information about the states of users, receives a failure detection signal that indicates the active controller has failed, subsequently receives a communication request, and establishes the requested communication in response to state information sent from the active controller.

In particular instances the invention may include one or more of the following features. The state information may include states of users. The active controller may receive requests for information about the states of users and the backup controller may request information about the states of users.

The backup controller may receive state information directly from the active controller. The system may include a registration server that receives state information from the active controller and sends it to the backup controller. The system may also include a second registration server that receives state information from the active controller and sends it to the backup controller. The active controller may add a sequence identifier to each state information message, so that duplicate messages will have the same identifier.

In another aspect the invention provides a communication system with multiple, independent user states. In this aspect the system includes one or more communication devices for each user and a controller that has a state setting interface with the capability to generate a user state change request. The controller responds to a state change request by activating some but not others of a plurality of user states defining the state of a user on a device, receives communication requests, and establishes a requested communication when one of the users is in an appropriate state for participating. This approach is necessary to capture the state of a user in a general business environment, because of the number of independent aspects of a user's activities.

In particular instances user states that may be activated may include SignedOn, Available, Talking, Inapplication, Idle, DoNotDisturb, Busy, Normal, AfterCallWork, Meeting, Away, Traveling, AtHome, NotInOffice, Holiday, Break, or Lunch.

Embodiments of the invention may have one or more of the following advantages.

The communication system exploits knowledge of user state to deliver efficiency benefits in general business environments. The system can enable users and corporations in these environments to manage and control their communications interactions to a degree that is impossible with any prior technology.

The system can receive state notifications associated with the users and devices making up the system and respond under scripted control. State notifications can trigger any system action under scripted control. This may include state notifications (true or transformed) sent to other users, but it may also include establishment of communication service. The system can maintain a representation of the states of all users and devices.

The system can receive communication service requests from users and respond under scripted control. The response is subject to the characteristics of the communication request and the state of the system. In particular users can specify what communications will be delivered as a function of the communication request and the user's state. The system executes communication requests by controlling media setup using the characteristics of the underlying transport, including any media (e.g. voice, data, email, video) supported by that transport. The system also maintains a data context associated with the call, so as to support application integration and collaboration.

The system can handle requests not only for immediate service, but also for pending service to be executed for specified combinations of system-wide user and device states. In particular, the system maintains lists of parties who wish to communicate and executes the communications on mutual availability of the parties. Failed requests for immediate service can be converted to pending service.

Pending service can be controlled and managed according to well-defined system interfaces. Users can prioritize, activate, deactivate, delete, and transfer their pending communications. When a pending communication is deactivated, it is not considered for execution based upon user states; when it is activated it is considered for execution. Pending service can be monitored by parties with access permission, and results (such as time to completion) are available in system reporting. Pending service can have priority over end-user notification of state, so that the managed priorities for execution cannot be circumvented by end-user camp-on.

The system is responsive to both corporate and individual communications objectives for both immediate and pending service. Corporate objectives can override individual ones in areas where they are imposed. This means, for example, that corporations can set priorities for work activities and assure that communications supporting those activities will be recognized and executed accordingly.

The system provides a comprehensive approach to managing of multiple devices associated with a single user. In particular, the system determines which devices a given communication request can access based on the characteristics of the communication (including the source user), the called party's scripted preferences, and the current system state.

The system presents new and advantageous forms of interaction with external users and business applications. Through the mechanism of pending service, communication requests can originate, for example, from web applications or corporate workflows and then execute, and be managed according to the states of the internal and external system users. For external users (vendors, partners, customers) state may be provided by web applications or Instant Messaging. This feature can enable a kind of reverse ACD, where the originating party avoids waiting on hold by receiving communication based on his own state. For business applications, state may reflect user activity in a Customer Relationship Management (CRM) application or completion of a work item in a corporate work flow.

The operation of the communications system can be customized to serve particular business applications. Responses to both state and service events are scripted, so that the response to CRM business state event can involve any system action. Further the scripts are represented as combinations of basic system operations stored in the system database. This means, for example, that a CRM application that manages the work activities and application data for a sales force can be extended into a customized communication system supporting that sales operation, where state events in the CRM system would generate communications activities and associated priorities in the communication system. It is particularly useful in this respect that the scripts are stored in transparent form in the database, because it means that the entire system can be managed through the database tools of the CRM application.

The system can present a new approach to fault-tolerance and scalability by leveraging the infrastructure of user state management. In this system users can connect to servers for service and state messages and for management of pending communication. Servers themselves can use the same registration and state distribution mechanism to forward events and to keep their own internal state representations up to date. In the case of failure, users connect to alternative servers provided with the same scripts and an up-to-date view of system state. This means that a single, basic infrastructure serves as both the system application framework and the means of achieving fault-tolerance and scalability.

Other advantages and features of the invention will be apparent from the following description of particular embodiments thereof.

DESCRIPTION OF DRAWINGS

FIG. 3 is a diagram of state messages.
FIG. 4 is a diagram of state notification.
FIG. 5 is a diagram of a communication request.
FIG. 6 is a diagram of communications status.
FIG. 7 is a diagram of call status data.
FIGS. 12A–12F are diagrams of user client displays.
FIG. 20 is a diagram of pended call execution.
FIG. 22 is a diagram of pended call insertion.
FIG. 23 is a diagram of other interaction interfaces.
FIG. 24 is a diagram of other network interfaces.
FIG. 25 is a diagram of network interworking.

DETAILED DESCRIPTION

Structure

Figure 1:
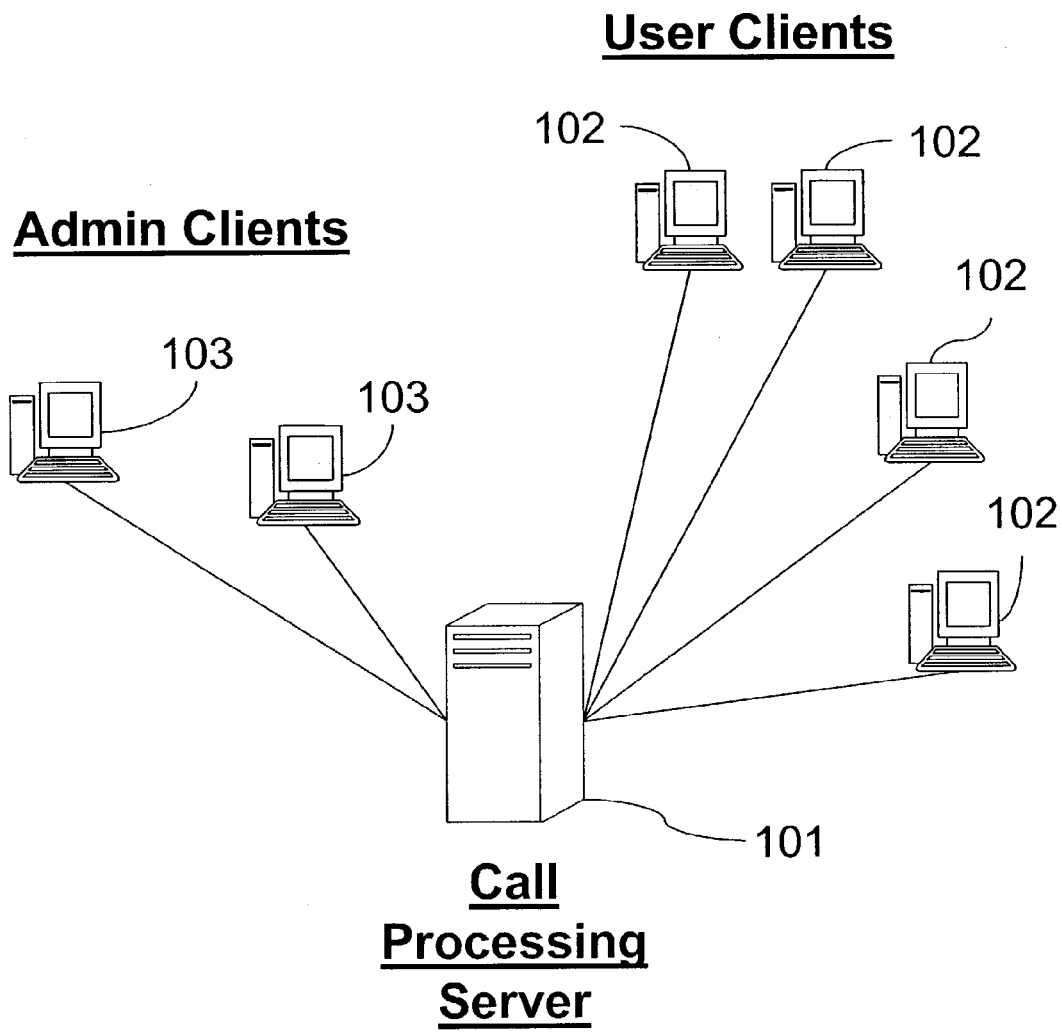
FIG. 1 is a diagram of a communications system.

FIG. 1 presents an overview diagram of the main elements of a communications system. There are three types of elements: the Call Processing Server 101, the User Clients 102, and the Admin Clients 103. These are familiar functional elements in a communications system: the Call Processing Server is the central control of the system, the User Clients access the system services on behalf of users, and the Admin Clients are the means of configuration and operation of the Call Processing Server. In the particular embodiment described the communication between components is provided by conventional Transmission Control Protocol/Internet Protocol (TCP/IP) data networking as supported by the Microsoft Windows operating system. For this description the term "call" refers to a communication without implications for the type of media.

The communication control system described relies on the underlying environment to provide the communications media input and output (audio, video, text), the facilities to establish communications connections, and the data communications linkages between the elements of the system. In the particular embodiment described, these functions are supplied by the Windows environment, including in particular the communications capabilities of Microsoft Real-Time Communications (RTC). In this case the computers are communication devices—using a microphone and speaker for voice or an attached camera for video. Other embodiments are described later, including other types of smart communications devices and more traditional PBX phones. The control system of the invention is common to all of these examples, using the communications media and data networking that are present in the environment.

The Call Processing Server (CP Server) 101 performs three primary functions on behalf of the User Clients 102:

1. It enables User Clients 102 to set their states and receive current values of state for themselves and other users and devices as presented by the logic of the CP Server 101.

2. It enables the User Clients 102 to request and receive communications services. These services may be requested to take place immediately or when a specified a specified combination of user and devices states is present (pending services).

3. It enables the User Clients 102 to manage pending services by prioritizing, activating, deactivating, deleting, inserting, and transferring individual items.

In one embodiment the CP Server 101 runs on Microsoft Windows NT or Windows Server 2003 with a database that is implemented with Microsoft SQL Server 2000. The logical structure of the CP Server application is given in FIGS. 8–11. In a small configuration it can run on a single machine, i.e., a personal computer; for large implementations a scalable, fault-tolerant architecture is described in FIG. 14.

The User Client 102 enables users to access the above CP Server functions. As such, it includes both user interfacing functions and communications functions with the server 101. In a particular embodiment the User Client 102 operates as a Windows XP application, and the user interfacing functions are based on Windows graphical displays. Audio and video media can be provided by Universal Serial Bus (USB) devices such as an i750 telephone from Clarisys, a DSP-100 headset from Plantronics, Inc., and a QuickCam Pro 3000 video camera from Logitech, Inc.

The User Client 102 includes two distinct types of interfaces to CP Server 101. The first is a message-based interface used to communicate state and service operations between client 102 and server 101. This is the Server Messaging interface. The second, the Call Status Interface, is a data-oriented interface that enables the client 102 to operate on a server-maintained list of pending communications. These are described in detail in the FIGS. 2–7. For reporting purposes, the User Client 102 also has read access to user-specific data in historical tables of system events.

Figure 12:
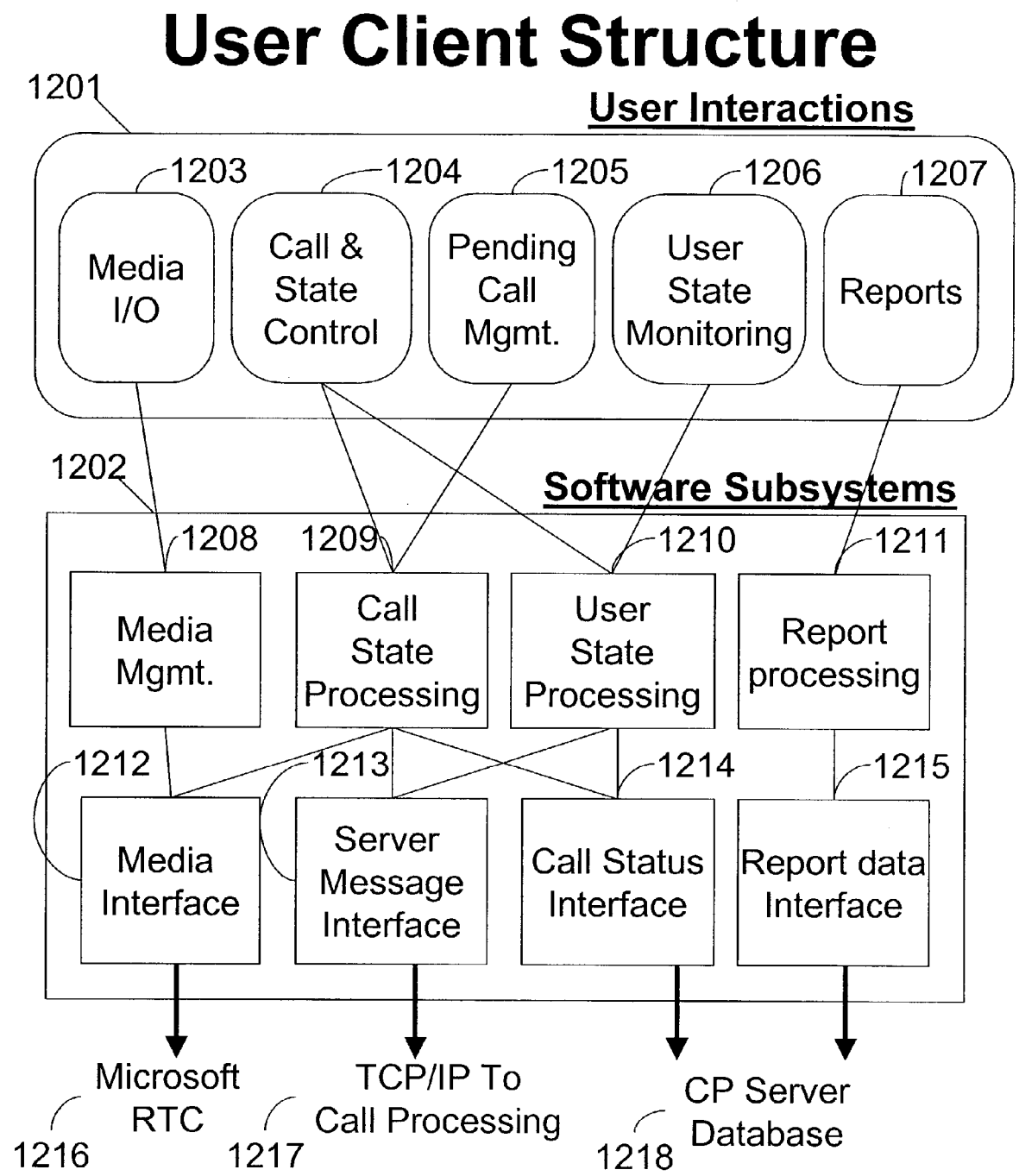
FIG. 12 is a diagram of a user client structure.

The structure of the user client 102 is presented in FIG. 12. Other types of clients are presented later that enable different types of users to interact with the system using these interfaces.

The Admin Client 103 in the particular embodiment is a Windows XP or Windows Server 2003 application. The interface between the Admin Client 103 and the Call Processing Server 101 is by update of the CP Server's database. Updates to the database are propagated to real-time call processing as described the discussion of CP Server architecture in FIG. 8.

The Admin Client 103 supports two primary areas of configuration:

1. Defining the characteristics of the users, devices, and other system objects.

2. Specifying the functional scripts that determine how the system responds to service and state events. These scripts are stored in the database as collections of link, node, and page items with properties defined by database fields.

For reporting purposes, the Admin Client 103 also has read access to historical tables of system events. The structure of the Admin Client is given in FIG. 13.

Because the interface used by the Admin Client 103 is exclusively to the database and because all of the configured items, including the scripts, can be understood as database entries, the Admin Client functions can be supported by any database client development tool. This enhances the integration of the communication system with user business applications, as presented in FIG. 33.

FIGS. 2–7 describe the detailed structure of the interface between the User Clients 102 and the CP Server 101.

Figure 2:
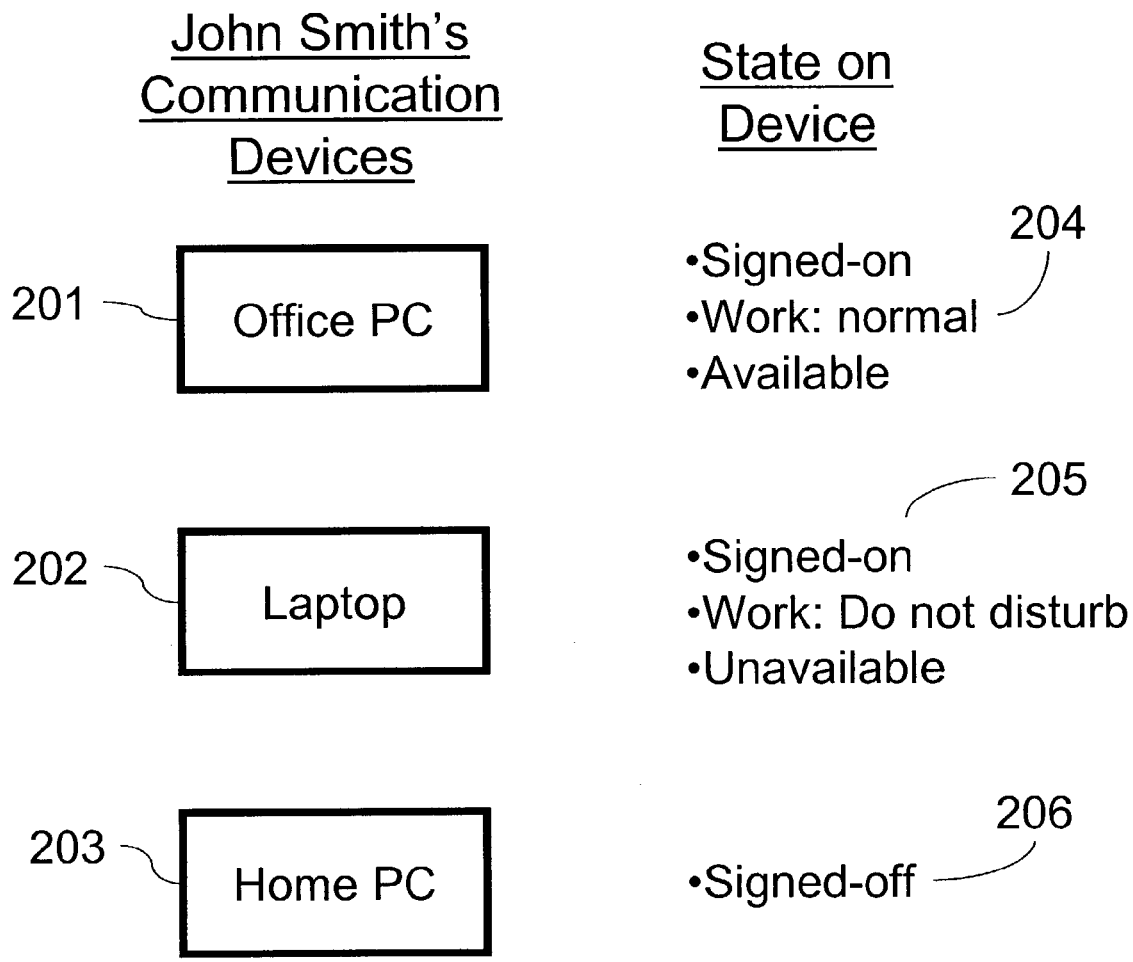
FIG. 2 is a diagram of user state.

FIG. 2 is an example illustrating the state of a user in a particular embodiment. The hypothetical user John Smith has three devices for communication in the system: his office PC 201, his Laptop 202, and his home PC 203. Associated with each of these devices is a set of activated user states that describe his activity on that device:

On the office PC the states are (204) signed-on, in a normal-task workstate, and Available to take a new communication.

On the laptop the states are (205) signed-on, in a critical-task workstate, and Unavailable for a new communication On the home PC the single state is (206) signed-off.

As background for FIG. 2, it is useful to review the role of user state in communication. Historically communications systems have concerned themselves primarily with the busy/idle status of phone lines, but the line state does not reflect the state of the user. To give a few simple examples:

ACD's have long recognized that agents frequently have work to do after a call is completed and before they are prepared to take a new call. "After call work" has consequently become a standard ACD agent state during which the agent is unavailable to take another call.

In a general business environment, different calls may have different priorities (so that it might be desirable and appropriate for one with a higher priority to interrupt another with a lower priority), and the appropriateness of a communication for an activity depends upon what that activity actually is. It is advantageous for the definition of user state to reflect the dimensions of user activity.

FIG. 2 shows the state of a user as a set of activated user states for each device 201, 202, 203 belonging to that user or where the user has signed on. For each such device the user can have an arbitrary number of independent user states depending upon the user's activities. A user sends state change messages each indicating a desire to activate or deactivate a user state on a device, and receives state changes message from the CP Server 101 indicating user states that are activated and deactivated for the user on particular devices. The individual user states may be standard system states such as Available, or customized user states such as the workstates normal-task and critical-task. A user state may also be defined a combination of general user state such as Inapplication, plus a specific value such as Powerpoint.

A non-exhaustive list of possible user states follows:

SIGNEDON
AVAILABLE
TALKING
INAPPLICATION
IDLE
DONOTDISTURB
BUSY
NORMAL
AFTERCALLWORK
MEETING
AWAY
TRAVELING
ATHOME
NOTINOFFICE
HOLIDAY
BREAK
LUNCH

FIG. 3 shows the content of the state change messages indicating a change of user state. For a change of user state the user and device identifiers are specified, as well as the state and whether it is being activated or deactivated. A user state data value may also be included if necessary to further define the user state, as noted above for the general Inapplication user state. Messages with this content are sent to the CP Server 101 to indicate a request to change state and received from the CP Server 101 to indicate the actual system state.

In addition to user states as shown in FIG. 2 there is also a simpler notion of device state. Device states are associated directly with devices 201, 202, 203 and take on values such as Alerting which are descriptive of the software and hardware, not the activities of the user. The device state message includes the device identifier, the state, and the activate/deactivate indicator.

A non-exhaustive list of possible device states follows:
CONNECTED
ACTIVE
IDLEDEVICESTATE
ALERTING
CONFERENCE
HOLD
INITIATING FIG. 4 shows how users subscribe for event notification. Users can subscribe to user state notifications on a user-on-device basis; for devices the notification is naturally per device. As noted in FIG. 4, the subscription registers interest in receiving notifications, but that does not mean that the subscribing user will be informed of the actual state of the user or device. The actual information sent to the subscribing user is determined by scripts controlled by the watched user that determine the consequences of user or device events. This process is described in more detail in connection with the server architecture in FIGS. 8–11.

FIG. 5 shows the content of a Communication request. These messages are sent from a User Client 102 to the CP Server 101 to request establishment of a communication session and from CP Server 101 to terminating User Client 102 to offer the communication session. The fields in the request include the calling and called user identifiers, the call information (including subject, priority, media, and any other call context), and any pending state information to be used to determine when this call should be established (as a function typically of both calling and called user states). In a particular embodiment, the subject, priority, and media are presented by the User Client 102 to the called user when a call is set up, and they are also displayed with pending communications. The call context information is used, for example, to support collaboration between desktop applications at the calling and called users. To be specific, this can be used to set up a communications session to support collaborative work on a Microsoft Powerpoint presentation, in which case the call context information would define the Powerpoint files and the initial slide. A typical example of a pending communication would be a call that executes when both parties are in the Available user state.

The communication request (FIG. 5) sent by the client to the server identifies the target user but not the specific user devices (in this particular embodiment) to which the communication request should be delivered. Identification of the target user's devices is done by the CP Server 101 based on script values associated with the target user. For example, with both immediate and pending communication, the called user can decide that a particular originating user can only access a certain subset of his devices. In the case of pending communications, the communication will take place only when the users are in appropriate states, and the called user has an appropriate state on an accessible device.

FIG. 6 shows an additional message used to inform clients 102 of changes to the status of pending communications items. The communications status message shown in FIG. 6 is sent when pended communications are added, deleted, or change state. In this way, all involved clients are informed when a pended communication request is added or deleted, or when the communication becomes active at one device. The message itself contains the same call description fields as in FIG. 5, with the addition of three fields specific to the function of this message: the Device ID identifies a device as appropriate, the Call Status field describes the current status of the call (e.g. pending versus active), and the Activate/deactivate field indicates whether the Call Status is starting or ending.

FIG. 7 shows the structure of the data records used to manage pending communication service. This can be viewed as a data record maintained by the CP Server 101 as part of its list of pending communications. These records can be accessed by clients 102 (subject to permissions), and fields can be updated to enable the clients 102 to manage the communication items.

The data fields in FIG. 7 contain all of the information of a communication request in FIG. 5, as well as additional information describing its current status. For pending communications the Pending State Info will typically contain both the called and calling party target states, whether explicitly present in the communications request or implicitly determined by other system data. The additional information includes the following items:

Status: the status of the call, e.g. active or pending as in FIG. 6

Devices: for an active call, the devices on which the call is active

Figure 8:
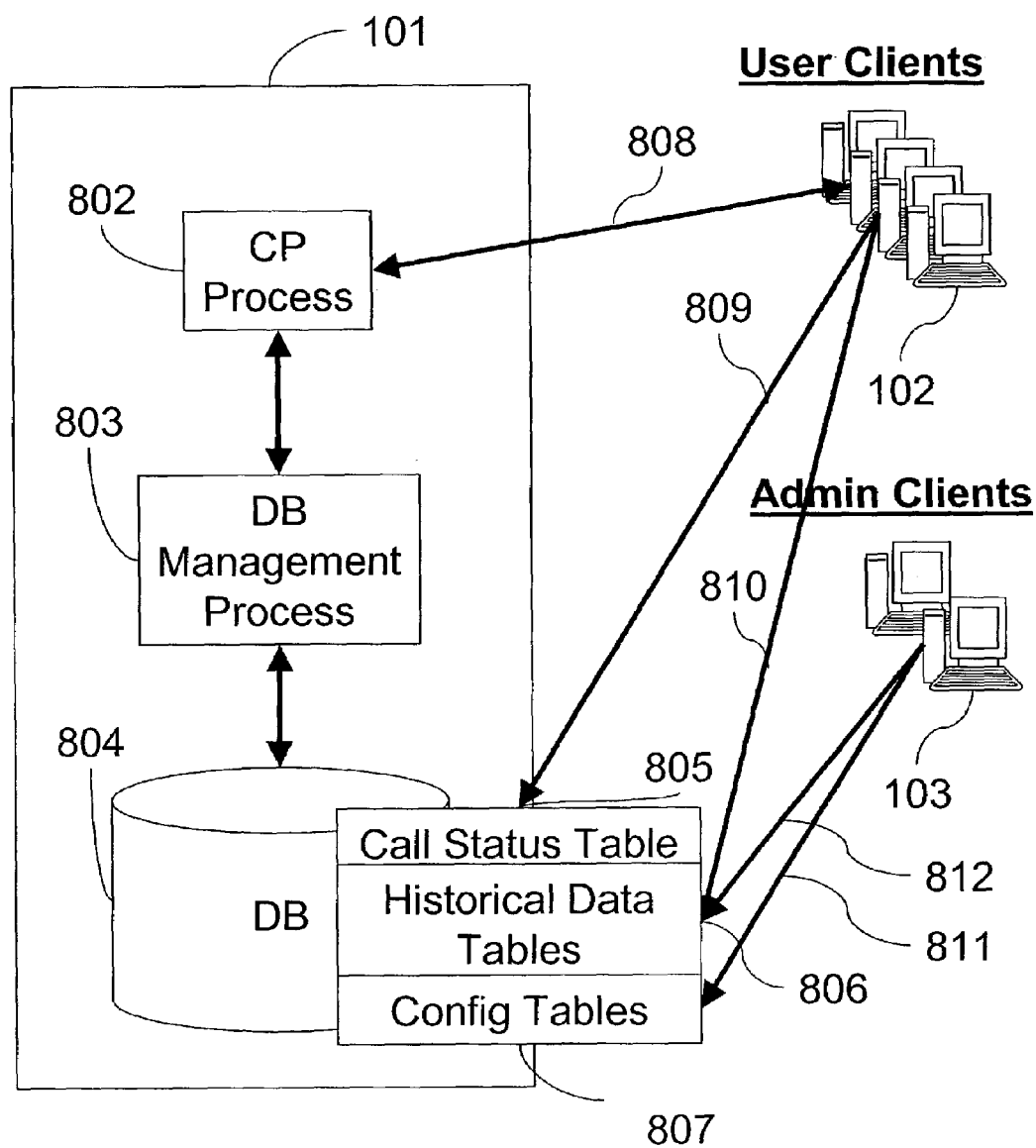
FIG. 8 is a diagram of a call processing server.

Pending Order—Calling User: priority order given to this communication by the calling user Pending Order—Called User: priority order given to this communication by the called user Pending Order—Corporate: priority order showing value of this communication to the business History: gives information about the handling of the communications request thus far, including the create time and the connect time for an active communication Deleted: used to delete the call and to manage other updates, as discussed for FIG. 8

Typically a user will have access only to his own communications and his own ordering. Users with system privileges can have additional permissions, such as the ability to access and set the corporate priority order. An ordinary user can set his order field to change his user priority order for the call, set appropriate values of the delete field to activate, deactivate, and delete the call, and, if he is the called user, change the called user field to transfer the pended request. The pending order values determine which call associated with a given user will execute when a user changes state (e.g. which call will attempt to complete when a user becomes Available with multiple calls pending and other users in appropriate states). The details of this logic are given in FIG. 20.

In the particular embodiment described, the Call Status data is contained in the Call Status table in the CP Server database as described in the discussion of FIG. 8. For this reason, the Call Status data can be retained when the CP Server is restarted. Alternative methods of interacting with this data are discussed in the Other Embodiments section.

The next figures describe the detailed structure of the CP Server. FIG. 8 shows that at the highest architectural level the Call Processing Server 101 has three components: the call processing or CP process itself 802, the database 804 (with call management, configuration, and reporting roles as already discussed), and a database manager (DBM) process 803 that extracts data from the database for presentation to CP. In the database, the figure shows three sets of database tables: the Call Status table 805 that contains the Call Status data just discussed in association with FIG. 7, the Historical Data tables 806 that are used to support the reporting features of the User Client 102 and the Admin Client 103, and the Config tables 807 that are used for the configuration functions of the Admin Client 103. Additional detail on the Config tables is given in association with the structure of the Admin Client in FIG. 13.

The figure also shows the client interfaces to the CP Server. For the User Clients 102 the Server Message interface is indicated by arrow 808 connecting the User Clients with the CP process, the Call Status interface is shown by arrow 809 connecting the User Clients with the Call Status table 805, and the User Client reporting interface is show by arrow 810 connecting the User Clients with the Historical Data tables 806. For the Admin Clients 103 the configuration interface is shown by arrow 811 connecting the Admin Clients with the Config tables 807, and the Admin Client reporting interface is shown by arrow 812 connecting the Admin Clients with the Historical Data tables 806.

The relationship among the three CP Server components 802, 803, 804 is as follows. Updates to the database can take place either to the Call Status table (for call management purposes) or to the configuration tables managed by the Admin Clients 103. To process these updates the DBM process regularly scans specific tables to identify inputs. In doing this the DBM process can consolidate multiple physical tables acting as input for the same logical table. It is also possible to have multiple DBM processes functioning simultaneously. The CP process also interacts with the DBM process (or processes) to record information in the database. This includes, for example, inserting or updating records in the Call Status table or inserting historical records in the Call Detail table. Write operations are performed in parallel on all active DBM processes.

For each client-updateable table, specific fields serve as flags to indicate changes. For the Call Status table the sign of the deleted field in the Call Status data of FIG. 7 is used to indicate an updated record; for the configuration tables there is an upload field used for this purpose. For flagged entries, the updated table rows are forwarded as message inputs to call processing. The CP process acknowledges the inputs to the DBM process, and the DBM process rewrites the row entries to remove the flags.

Figure 9:
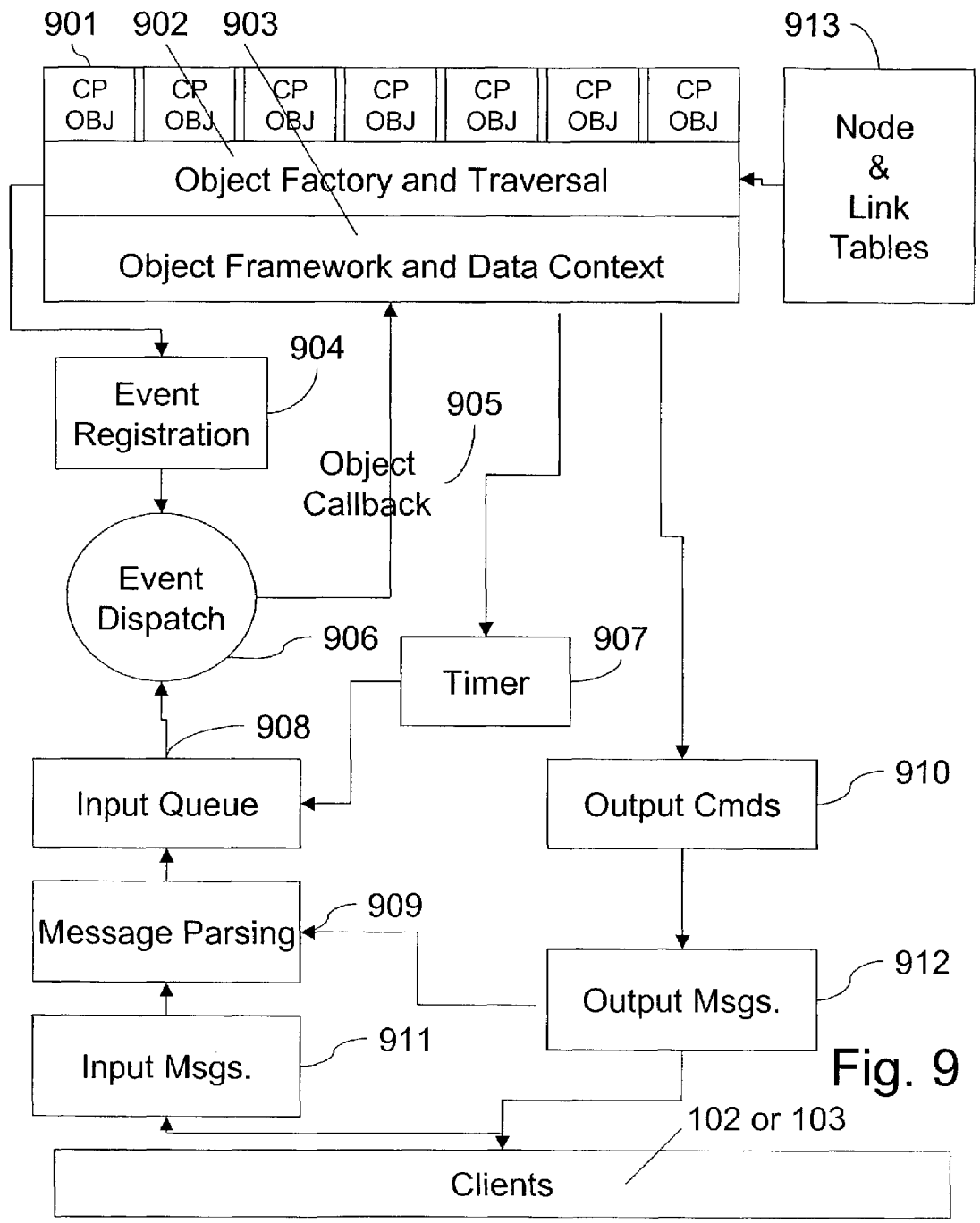
FIG. 9 is a diagram of a call processing structure.
Figure 10:
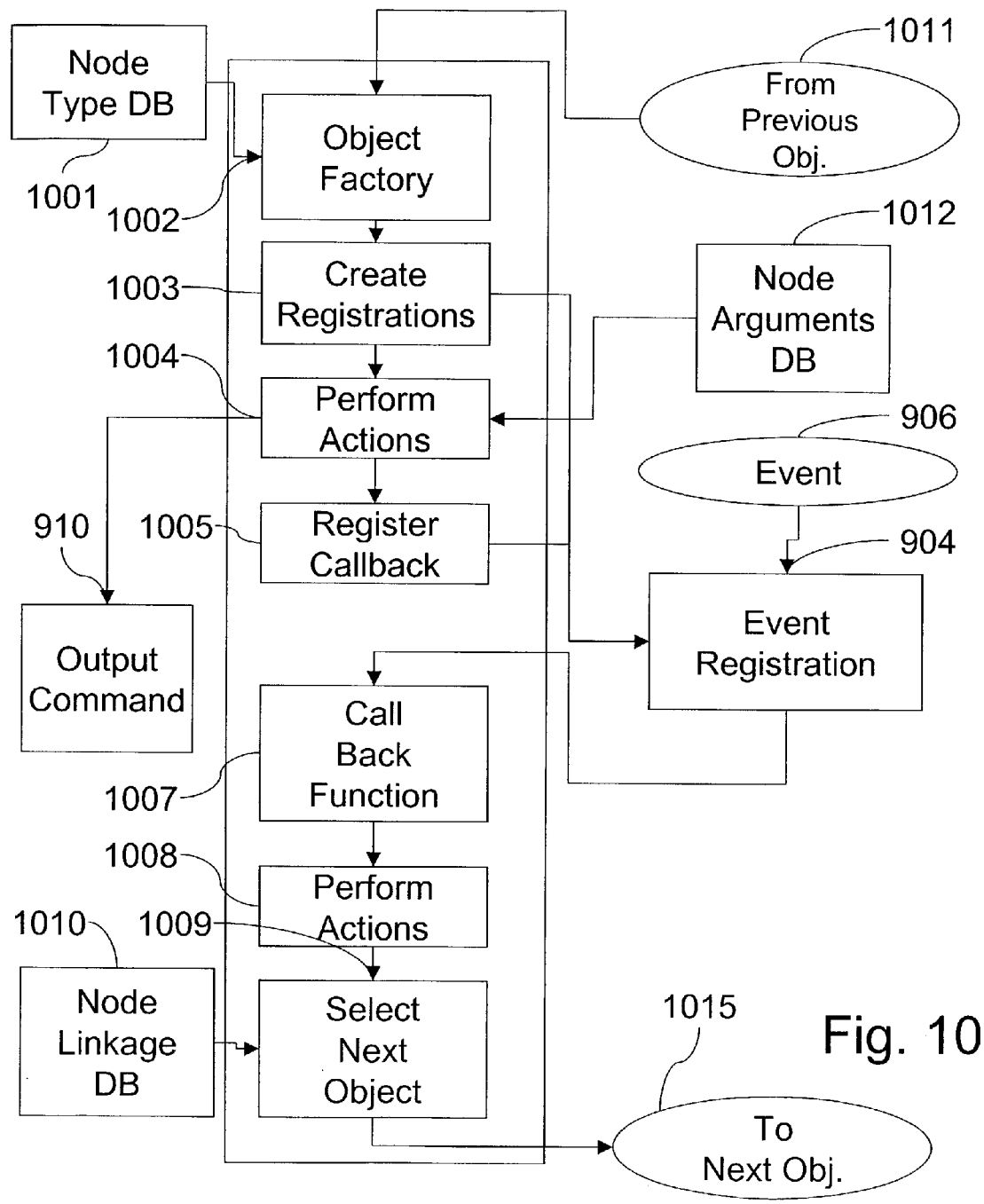
FIG. 10 is a diagram of a call processing object structure.
Figure 11:
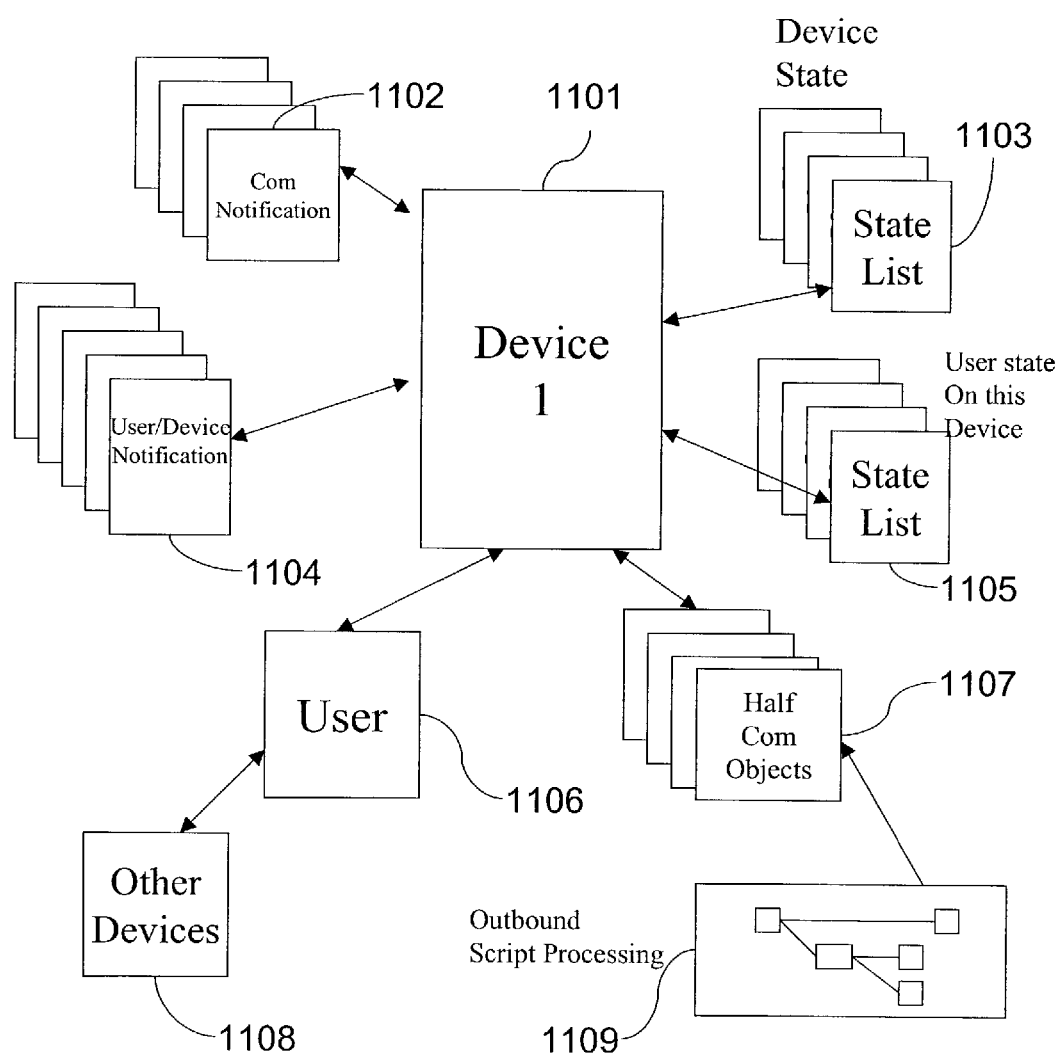
FIG. 11 is a diagram of a state handling structure.

FIGS. 9–11 describe the operation of the CP process itself. FIG. 9 shows the general mechanism for event processing, FIG. 10 gives a detailed view of an individual call processing object, and FIG. 11 describes CP Server data structures.

In FIG. 9 one sees how the resources of the CP Server 101 are organized for event processing. At the top we see the resources of the CP application: the currently-active call processing objects (CP objects) 901, the object factory and traversal mechanism 902 which creates and links those objects, and the object framework and data context associated with the objects 903. These are shown to be linked to the Node and Link Tables 913, which are the database representations of the scripts and provide the basis for creation of CP objects, as described in more detail in FIG. 10. Finally, the figure indicates that the CP objects have been associated through the Event Registration block 904 with the events that they are waiting to process. This registration process gives CP objects the flexibility to define the events of interest to them. This means, for example, that a Pend call object can register for state events representing the combination of states of users for which the communication can be established.

Starting at the bottom, we see how these CP process resources get applied to system events. Events come in at the bottom of the figure from the system clients 102 or 103. For event processing, all client actions appear as messages 911. The messages are generated by the clients themselves for the message interfaces or by the database scanning processes for database updates. For example, communication requests as in FIG. 5, state change requests using state messages as in FIG. 3, and changes to Call Status data of FIG. 7 all result in messages 911. These messages are parsed 909 to determine the events they represent and then inserted into the event input queue 908. At the Event Dispatcher 906 the events are matched up against the event registrations for the CP objects. Once the association of an event and a CP object is established, then the object callback 905 for that object is invoked, and execution of the object begins. Note that since the CP objects are directly derived from the routing scripts in the database, this structure enables the whole event-handling mechanism to be completely configurable in the database.

Two types of results are generated by the CP object processing: Timer events 907 and Output commands 910. Timer events are themselves inputs to the call processing structure and are introduced through the Input Queue 908 back into the Event Dispatcher 906. Output commands are actions to be taken as a result of event processing (e.g. send a state message or a call notification). These lead to Output messages 912. Most straightforwardly these messages are sent to the clients 102 or 103 that receive the state notifications or calls. In addition, however, these messages can be fed back into call processing as an interaction between CP objects (for example if multiple CP objects are waiting for alternative events and receipt of one cancels the others). For this reason the Output message block 912 is also connected to the Message parsing block 909.

FIG. 10 gives a more detailed look at the functions of FIG. 9 by showing how a CP object 901 works. Starting at the top, the object is created on the basis of its node type 1001 (e.g. pend call or send state) using the facilities of the object factory 1002 (part of 902) for the node type with the data associated with this object. This is kicked off by completion of processing in the previous object 1011 (or on initialization if this is the first object in the script). When the object is created it establishes its registration as discussed in FIG. 9 (e.g. the event tests to trigger execution of a pending call). It then performs any immediate actions 1004 which result in Output commands 910 as was discussed for FIG. 9.

At this point there is a dichotomy of behavior depending on the object types. If this is an object without registrations (e.g. Send state) then the object has completed its function and proceeds to the final block 1009 Select Next Object. This causes the next object to be located in the database 1010, created 1015, and completed.

On the other hand, if this object does create registrations (e.g. Pend call) then the object registers its callback 1005 and waits for an event. An event arrival from Dispatch 906 then hits the registration 904 and initiates the callback function 1007 (as described for Object Callback 905). This causes the callback actions to be performed 1008 (e.g. execute the pending call).

Once that is done, this object has completed its function. It selects the next node 1009 using the link data 1010 in the database, and then starts that node 1015 and ends.

FIG. 11 shows the basic data structures used by the CP Server 101 to manage state in the system. For simplicity of presentation, this figure assumes a single user associated with a device.

The presentation is this figure is organized around a user device 1101, which could be one of user devices 201–203 shown in FIG. 2. Associated with the device are first of all two state lists: the states of the device itself 1103 and the states of the user on the device 1105 (e.g., states 204–206 of FIG. 2). There are also notification lists associated with the device: addresses to send the User/Device notifications 1104 associated with Viewuser and Viewdevice registrations (FIG. 4) and addresses to send Communications Status messages (FIG. 6) indicating changes of status for pending calls. In this way, the device object keeps with it the references to the entities that need to be informed when it, its user, or an associated call changes state.

The device object includes a reference to the user 1105, who in turns references all devices which he either owns or on which he is currently signed on. The device also includes references to any communication session in which it participates though the half-com objects 1107. These are half-com objects, since what they reference is the local end of the call. The half-com objects are in turn referenced by CP objects concerned with the processing of the calls.

The general case, with multiple users per device, is straightforward but more complex to draw. In that case the fundamental entity is a user-device, the basic entity for user state as described in FIG. 2. There are state lists, notifications, and half-com objects associated with the user-device, as well as separate device states and notifications associated with the device itself. Each user-device by definition has a single user.

FIG. 12 gives the structure of the User Client 102. The two primary areas of structure are the User Interactions 1201 and the Software Subsystems 1202.

The User Interactions 1201 show five interfaces to interact with the user. The primary display component is the Call & State Control 1204. This enables the user to make and receive communication requests and to set his state in the various dimensions as indicated in FIG. 2. In the particular embodiment described there is a Windows form with buttons and menu items to set state, and a separate form to supply the information contained in a communication request message (FIG. 5). In this embodiment the Available user state indicates readiness to receive a new communication. The sound, video, or other communication media input is provided by Media I/O 1203.

Figure 12A:
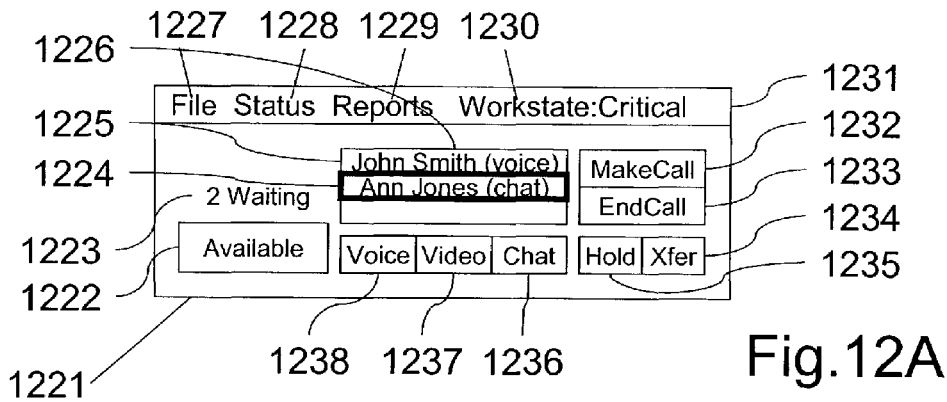
Figure 12B:
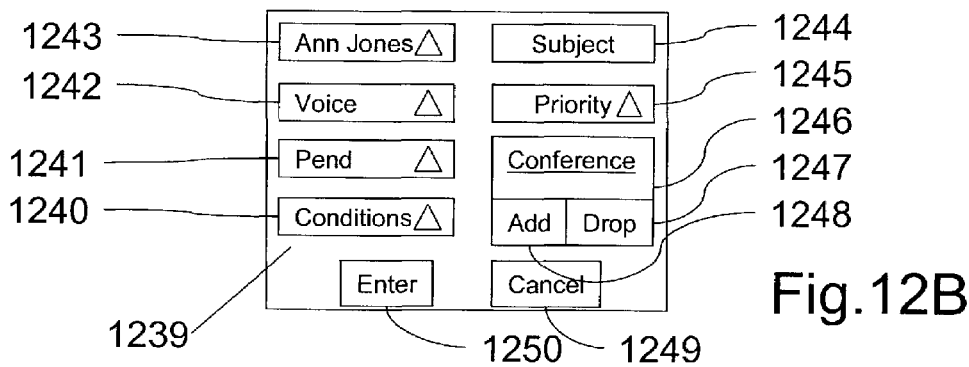
Figure 12C:
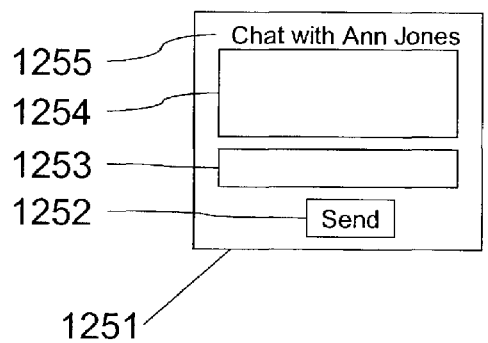

FIGS. 12A–12C present example user displays to support the interactions for Call & State Control 1204 and Media I/O 1203. FIG. 12A shows the primary display 1221 for Call & State Control. It includes an active communication display 1226 that contains communications items 1224, 1225 representing all communications that are currently active at User Client 102, each with an indication of the other party and the medium. One communication item can be selected, as indicated by the dark border of item 1224. For this selected communication the media may be changed by the Voice, Video, and Chat media buttons 1236, 1237, 1238. Also the hold, transfer, and disconnect operations can be performed by the buttons 1235, 1234, and 1233 respectively. The number of communications currently pending for the user is shown by display line 1223. The user's state on this User Client 102 can be changed by the Available/Unavailable toggle button 1222 and by the workstate menu 1230 on menu bar 1231. The workstate menu 1230 allows the user to become active in one out of a customizable list of workstates. Other items in menu bar 1230 are a File item 1227 that includes an exit item for the application, a Status item 1228 that is used to present displays 1256 and 1265, and a Reports item that is used to present display 1272. The MakeCall button 1232 presents display 1239 that is used to prepare a communication request message as in FIG. 5. For an incoming call there is an additional pop-up display that shows the caller, subject, priority, and proposed media for the call as defined by the communication request. The receiving user can accept the call, possibly changing the proposed media, or reject it. Once the call is accepted the media connection is established and presented to user with the Media I/O as discussed below.

FIG. 12B shows display 1239 that defines values for fields of a communication request message from FIG. 5. There are drop down lists to select the user 1243, the medium 1242, the choice of immediate or pending communications 1241, the pend conditions if any 1239 (e.g. both parties in the Available state), and the priority 1245. The text box 1244 enables entry of a subject description, and the Conference section 1246 enables parties to be added or dropped from a conference using Add 1248 and Drop 1247 buttons. As is typical in IP communication networks, conferencing can use a Multipoint Conference Unit (MCU), for example made by Radvision Corporation. There is also an Enter button 1250 to send the communication request message and a Cancel button 1249 to close the display to be closed without sending.

Media I/O may or may not have an associated display. If the Media is voice, then the media input and output are provided by audio devices, for example the microphone and speaker of the USB headset mentioned earlier. FIG. 12C shows an example text chat display 1251 that sends and receives text chat media. In the display there is a title that shows the communicating party 1255, a display box for the received text content from both parties 1254, an input text box 1253, and a send button 1252. For video, input is by a video camera and output is by a display that shows the video image.

Pending Call Management 1205 provides the user interface to support interaction with the Call Status data from FIG. 7. In the particular embodiment described this is done by the display 1256 in FIG. 12D with a series of data rows 1257, 1258, 1259, 1260 corresponding to individual pending communications. These rows can be reordered by drag and drop. They can be deleted by the Delete button 1263 in each row. They can be activated, deactivated, deleted, and transferred with the Update button 1264 in each row, which then presents the options. A user with system privileges is able to set the corporate priority. The display 1261 for each communication includes the name of the other party, the subject and priority 1262, and the current status of the communication 1263, which can include the length of time the communication has been pending.

User State Monitoring 1206 displays state information about other users ("buddies") or devices that the user has chosen to observe. As noted previously, the displayed information represents a scripted response to state changes requested by those users and not necessarily the actual user state information itself. In the particular embodiment described user state information is presented by display 1265 in FIG. 12E. In this display there is a row 1268, 1269, 1270 for each observed user. In that row there is a block 1270 corresponding to each device for that user. These blocks can change color depending upon the Available and Signed-on states for the user on the device. Clicking a block brings up a text box 1271 with a complete list of user states for the user on the device.

Historical reporting from the system database is presented by the report interface 1207. An example report 1272 is shown is FIG. 12F. As indicated by the title 1277 this report shows all communications for the user in order of start time. There is a row 1273, 1274, 1275, 1276 for each communication. The information for each row includes the originating and terminating user, the call info from the Call Status data of FIG. 7, the start time for the communication, the duration of the communication, and the time that the communication spent pending for establishment of the communication.

The Software Subsystems 1202 mediate between the communications interfaces and the user interactions. User State Processing 1210 handles state change messages and keeps a list of all states associated with the observed buddies and with the client user. Call state processing 1209 handles communication request and status messages and keeps an updated list of all communications for this user so as to drive the displays and user interactions. Media management 1208 associates the media inputs from 1203 with the external media interface 1212. Report processing prepares specific reports based on read-only queries over the data interface 1215.

Of the four interface modules 1212–1215, two have already been discussed and one is new. The Server Message Interface 1213 and the Call Status Interface 1214 are the two interfaces to the server discussed in association with FIGS. 1 and 3–7. The Media Interface 1212 and the Reporting Data Interface 1215 are new.

The Media Interface 1212 is the means by which the actual media connections for communications are established. In the particular embodiment described this is done using the Real-Time Communication (RTC) capability provided with the Windows XP operating system. Microsoft RTC includes the capability to establish voice, video, and Instant Messaging connections over an Internet Protocol (IP) network based on either IP or Session Initiation Protocol (SIP) network addresses. The Reporting Data Interface 1215 is a database query interface to access historical data on the CP Server. As shown in the figure, in the particular embodiment described both the Call Status Interface and the Reporting Data Interface are query interfaces to the system database. However, their roles are functionally distinct and other implementations could treat them differently.

Figure 13:
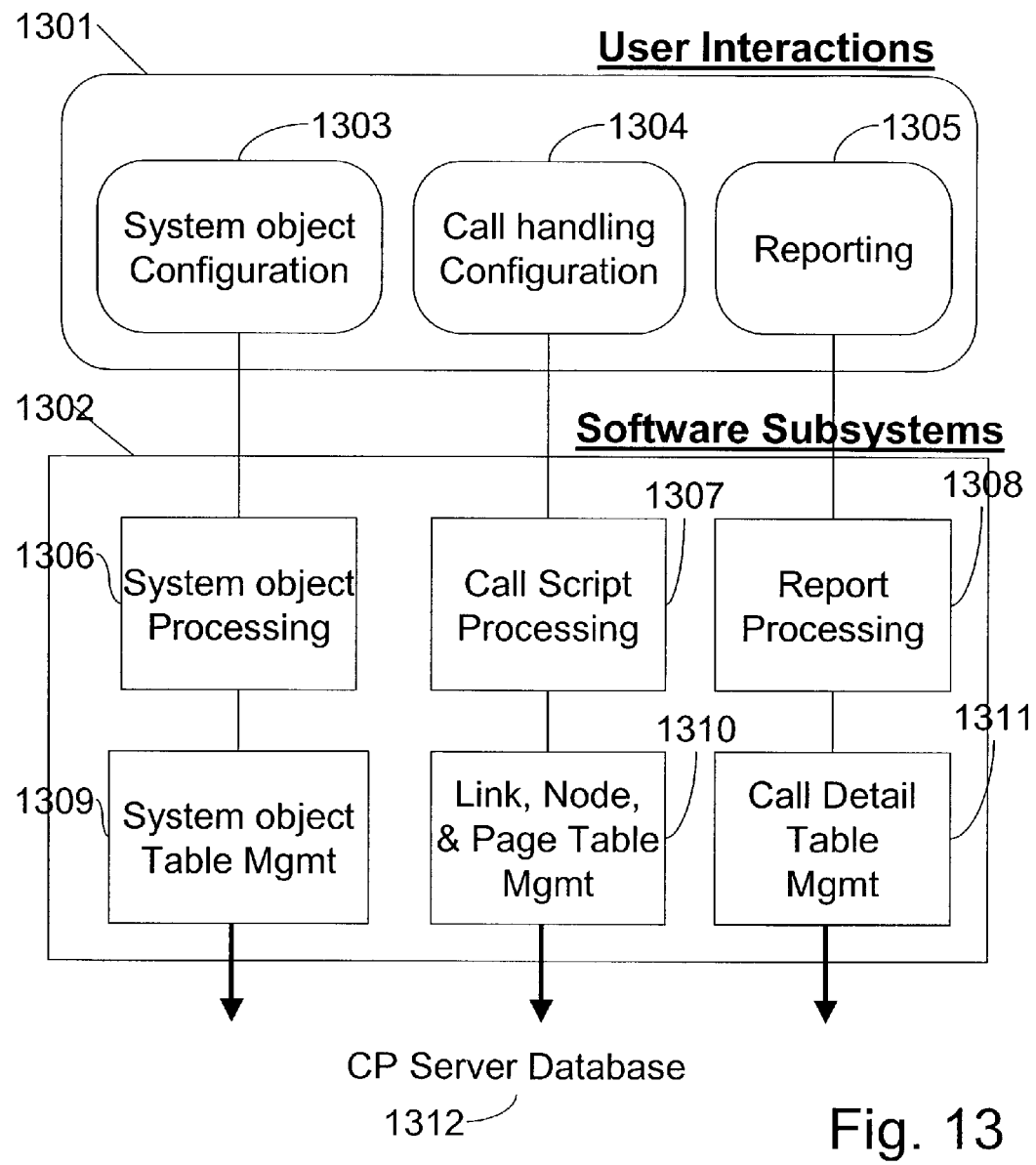
FIG. 13 is a diagram of an admin client structure.

FIG. 13 gives the structure of the Admin Client 103. This is somewhat simpler than the structure of the User Client 102, because there are fewer functions and all interfaces are to the CP Server database. As discussed above, in the particular embodiment, the interactions of the Admin Client are with the database component of the server.

There are three primary User Interaction components 1301 reflecting the functions of the Admin Client: System object configuration 1303, Call Handling configuration 1304, and Reporting 1305. The interactions associated with the system object configuration tend to be grid-oriented. For example, the user of the Admin Client is able to create and delete users and devices and associate them with each other via ownership. The Admin client is also the means to configure call evaluation objects, which determine corporate priorities from the call characteristics in FIG. 5.

Call handling is presented to the user by a visual scripting language. As noted earlier, scripts are stored as collections of links and nodes on pages and are drawn and edited as functional flow charts. Reporting gives Administrative personnel access to historical results for groups of individual users. A subset of the Admin Client functionality is available to an individual user to set call handling options for himself.

System object processing 1306, Call Script processing 1307, and Report processing 1308 mediate between the user interactions and the database tables in which the information is stored. The update procedure includes the capability to schedule the time at which the updates will be loaded into real-time call processing. The updates themselves are made to the System object tables for System Object processing and to the Link, Node, and Page tables for the Script processing. For Report processing the data access is read-only.

Figure 14:
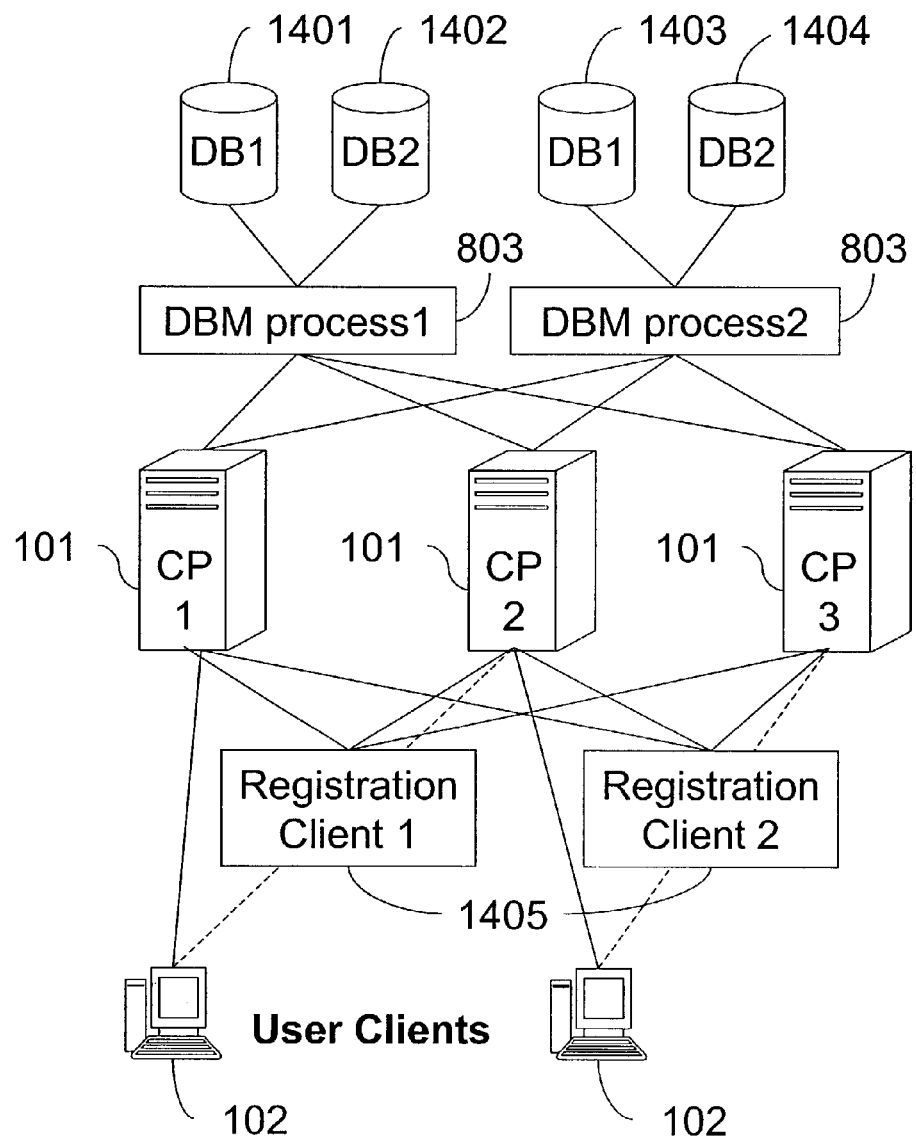
FIG. 14 is a diagram of fault-tolerance and scalability.

The final figure of this section presents a hardware architecture for deployment of the CP Server in a large-scale system. While the CP Server operates as a single functional entity, implementation on a single machine may not satisfy requirements for fault-tolerance and scalability that arise for large systems. FIG. 14 presents a fault-tolerant and scalable architecture for the CP Server, building upon the architectural concepts already introduced for state distribution and call management.

In this architectural diagram there are three copies of the CP Server 101 providing call processing services in a redundant way to two sample User Clients 102. The three copies of the CP Server maintain the same database configuration for call processing, as provided by the elements in the top half of the figure. In the figure there are two pairs of replicated databases 1401, 1402 and 1403, 1404 that are combined by independent DBM processes 803 into consolidated data images that are presented to all of the CP Servers (see FIG. 8 for detail on DBM processes).

Additionally, in the bottom half of the figure, one sees how the CP Servers acquire the state information from other CP Servers, so that one can take over processing from another in case of failure. The distribution of state information is by a new type of system element, the Registration Client 1405. A Registration Client sends Viewuser and Viewdevice messages (FIG. 4) to register for events from each of the CP Servers, and each CP Server similarly registers with Registration Clients for events from the other two CP Servers. A single Registration Client therefore provides each CP Server with state information from the other CP Servers, and the protocols used by the Registration Client to acquire and distribute data are exactly the same as those used to distribute state to any other client in the system.

With two Registration Clients as in the figure, the distribution of state information can be made redundant, as each CP Server receives events from each of the Registration Clients. To exploit this architecture, the CP Servers support the capability for redundant state notification. Any client receiving state messages from multiple sources will normally receive multiple copies of each state change. With redundant state notification, a counter and server id is attached to each state value, so duplicates can be removed wherever they are received.

If one of the CP Servers fails, then the failure is detected by heartbeat, and its clients can logon to any other server, as indicated by the dashed lines from User Clients 102. The logon follows the normal procedure and new CP Server has both the database configuration and the current state information necessary to provide service.

OPERATION

This section describes operational procedures using the structures described in the previous section. In particular, we describe the information flows associated with the interface structures that have been defined.

Figure 15:
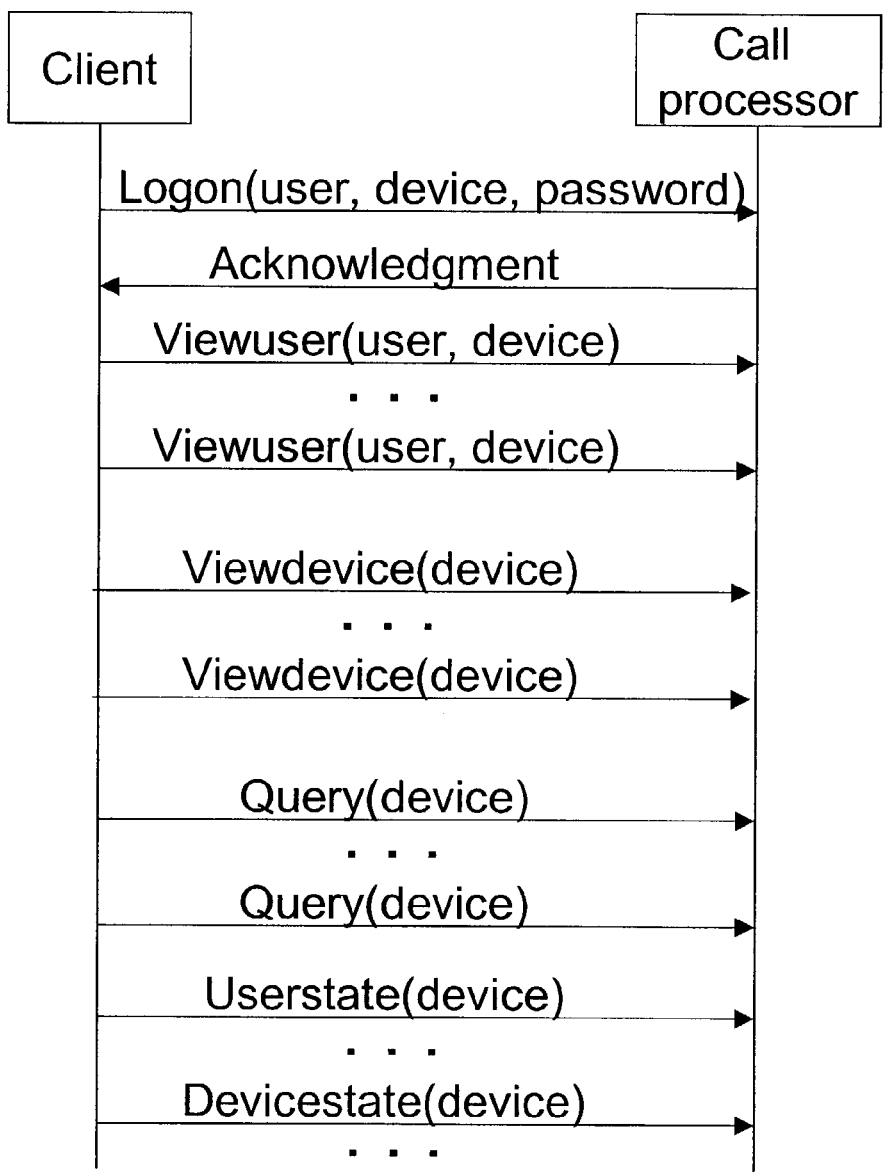
FIG. 15 is a diagram of user client initialization.

FIG. 15 describes the message flows associated with the initialization of the User Client 102 at logon to the CP Server 101. Following the logon message, the client specifies the notifications it wants to receive from the server. First there is a sequence of Viewuser and Viewdevice messages as introduced in FIG. 4. As noted earlier, the response to these messages depends upon scripting belonging to the watched users. Then there is a set of Query messages to register interest in receiving Communications Status messages (FIG. 6) for each of the user's devices. Communications Status messages are optional to allow for simple clients that do not need to handle them. Finally the client sends a series of User state and Device state messages (FIG. 3) to establish its initial state.

Figure 16:
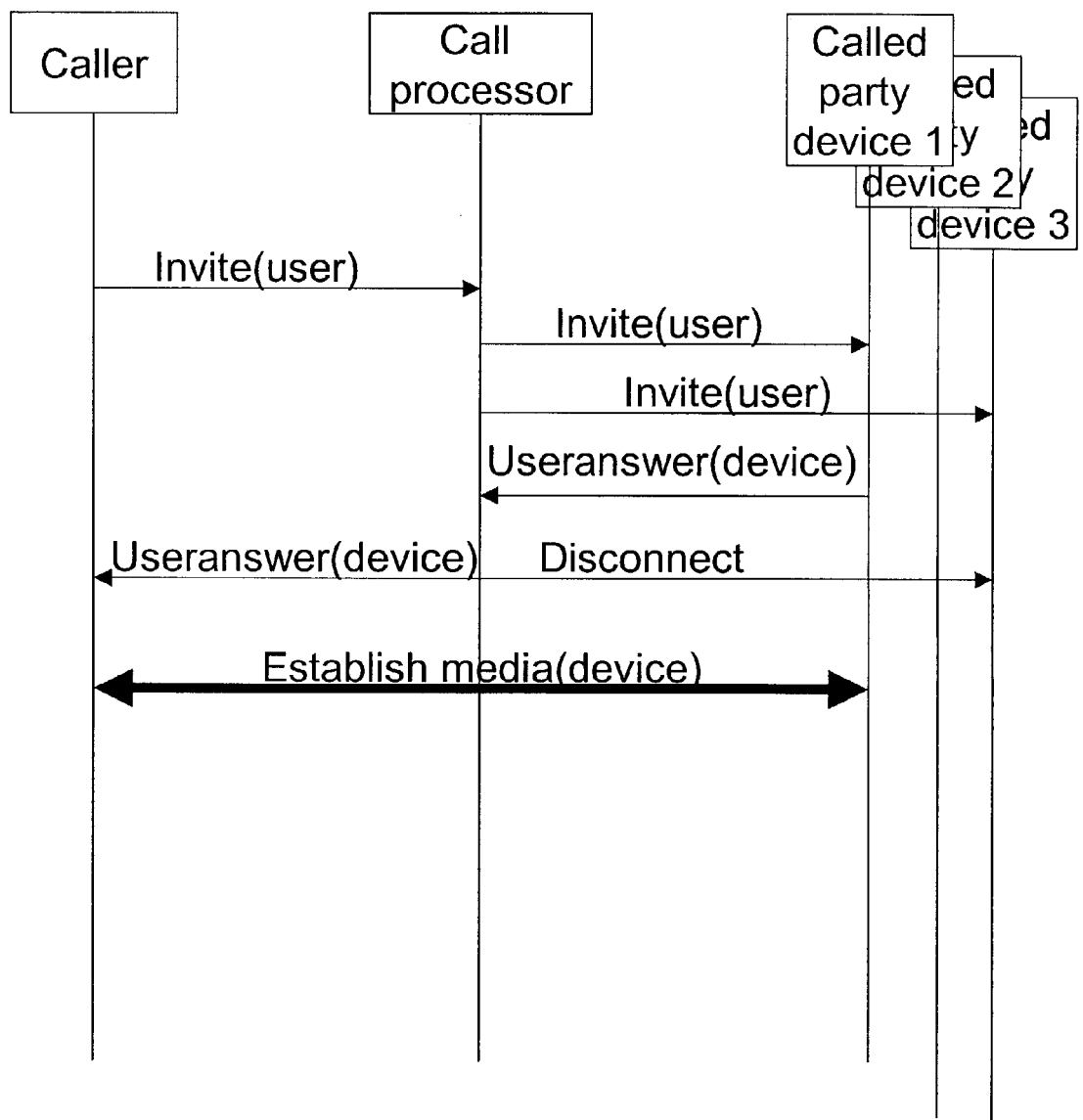
FIG. 16 is a diagram of ordinary call signaling.
Figure 17:
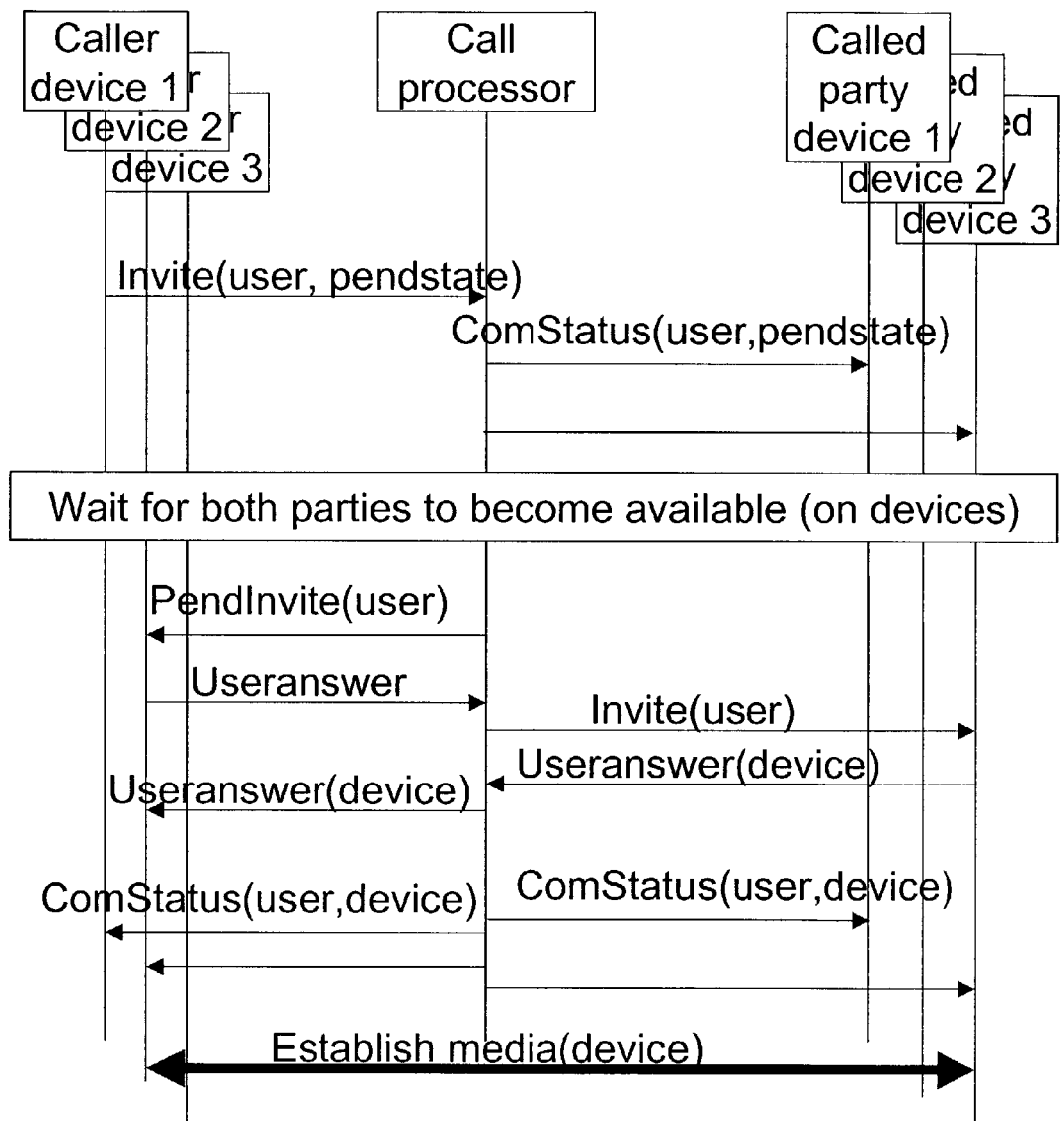
FIG. 17 is a diagram of pending call signaling.

Following this initialization the client is ready to initiate communication requests. FIGS. 16 and 17 show the handling of ordinary and pending requests. It should be noted that in this and the subsequent call flows, the message that delivers the content of a communications request from FIG. 5 is called an "Invite," following the terminology of the SIP protocol.

The ordinary communication sequence in FIG. 16 is straightforward. The initiating Invite message is as described in FIG. 5. Here the destination of the request is by called user. The CP Server determines which of that user's devices will be involved and sends the Invite on. The CP Server's action is scripted and can depend upon on any part of the call context and the system state. In particular the scripting can use a call evaluation object to establish a corporate priority for the call and consequently to which devices the call will be offered. In the figure only two of the called party's three devices receive the Invite messages. The user on one device then accepts the communication request with a Useranswer message. In response a Disconnect is sent to the other device, as the first device to accept gets the call, and all other Devices receive disconnects.

As noted in the figure, the Useranswer message contains a network identifier for the receiving device. This is forwarded with the Useranswer message to the initiating device. With this device identifier, the originating device then establishes the media for the communication session. As noted in FIG. 5, the Invite contains an indication of proposed media; this can be overridden in the Useranswer which determines the actual media established. As alternative for the connection of the media, the particular embodiment describes also supports a backward call setup in which the media is established from the receiving device in parallel with the Useranswer message.

Pending call handling in FIG. 17 is more complex, as it supports the unique features of pending communication. In this case the initial Invite contains both the target user and the pending states for the communication. As before, the server determines which of the target user's devices are involved in this communication. Those devices then receive Communications Status messages (FIG. 6) indicating that a pended call has been established.

This ends the first stage of the sequence. Because this is a pended call, call processing is suspended until the two parties are in appropriate states.

Call processing picks up again when the calling and called users have entered the appropriate states. Since they will have entered the states on specific devices, only those devices will be involved in subsequent call processing. In the figure, only one of the devices is still involved for each party.

The first message that is sent is a PendInvite. The Pendinvite contains the same fields as a regular Invite, but is sent to the originator of a pending call to indicate that the call is now ready to execute. In the figure the originating user accepts the call by sending a Useranswer message. The call can also be rejected by sending a Disconnect. Once the originating user accepts the call, then the call can complete as in FIG. 16. In addition, however, once the call does complete, Communications Status messages are sent to all of the calling and called user devices (capable of receiving Communications Status) to indicate that the call has completed and to identify the active user device. In this way, all of a user's devices can appropriately display all calls for that user, regardless of where the calls terminate.

Figure 18:
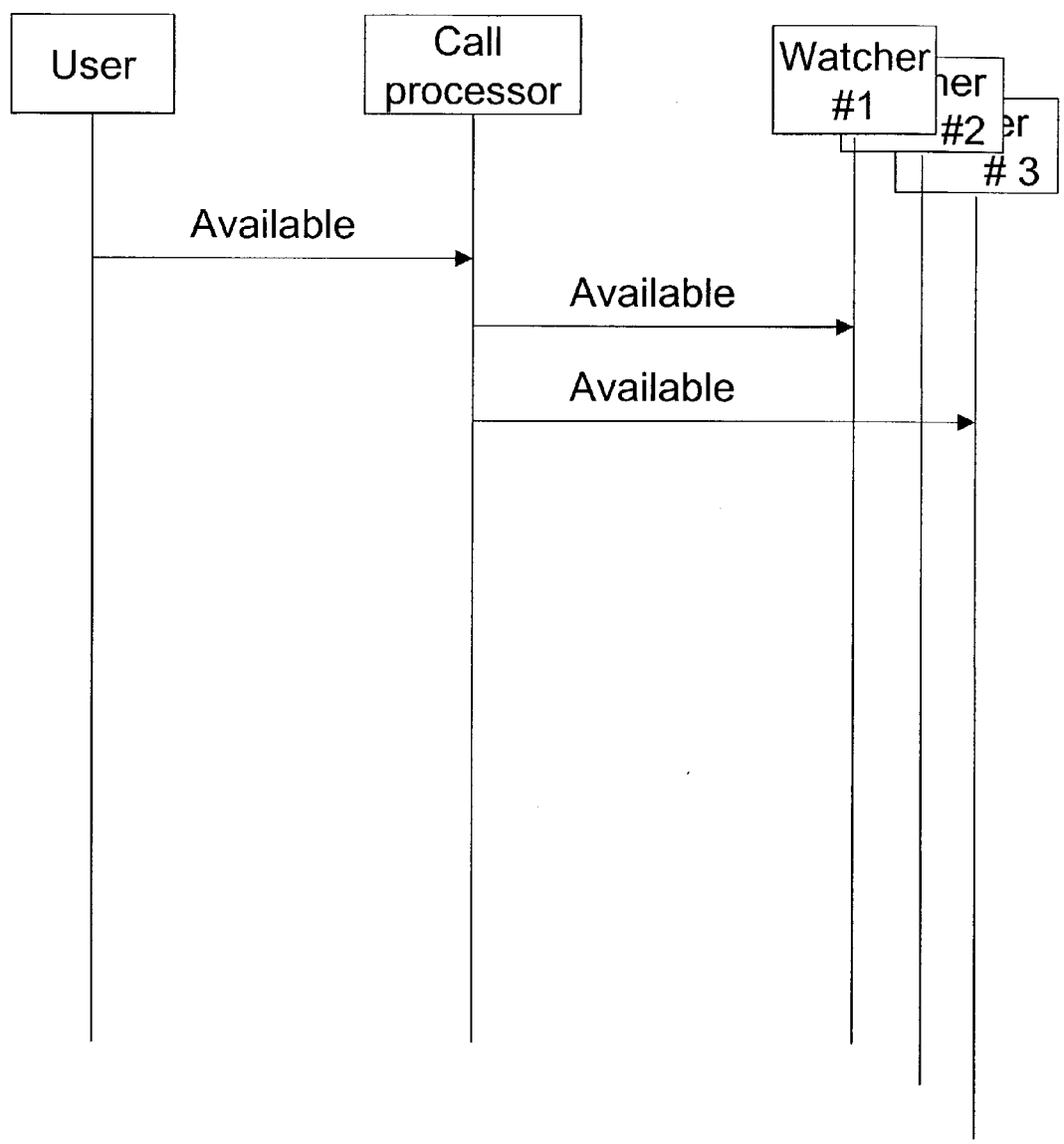
FIG. 18 is a diagram of ordinary user state change.
Figure 19:
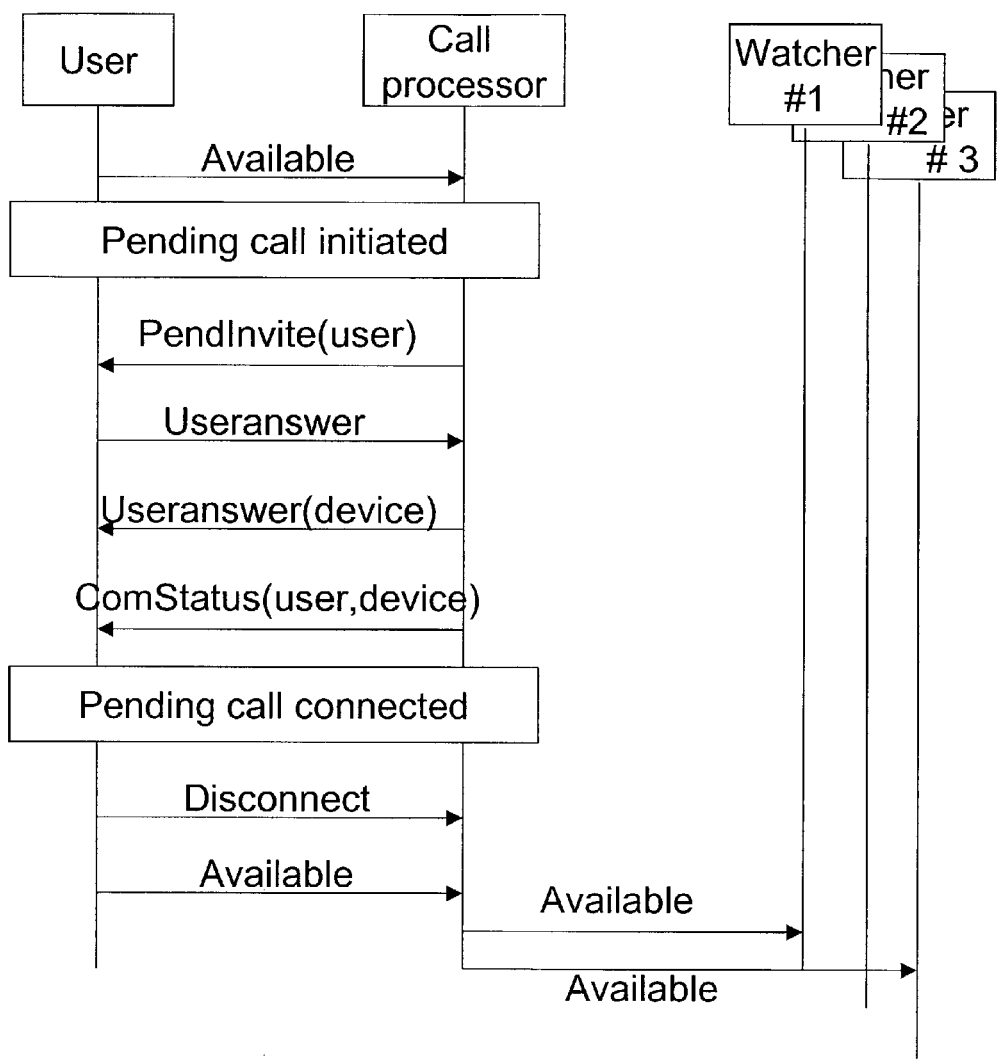
FIG. 19 is a diagram of user state change with outbound pending call.

FIGS. 18 and 19 describe the interaction of the state changes with the pending call mechanism. For purposes of the examples, the state transition that causes execution of the pending call is activation of the Available user state for a particular user on a device. As point of departure, FIG. 18 describes an ordinary user state change without a pending call. In this case the user send a userstate(Available) message to the server, which determines what the watchers (who have subscribed to this user event) will see. In the figure, two of the watchers get the userstate (Available) message, and the third gets nothing.

In FIG. 19 by contrast the userstate (Available) message only causes triggering of the pending call with no indication to the watchers that the user has activated the Available state. This is done in the particular embodiment decribed by scripting the pending call mechanism to have first access to the user state change, and the execution of the pending call is triggered without sending notification of the user activation of Available. Because the pending call mechanism has first access to the state change, this means that the system's managed control of pending communication takes precedence over unilateral call camp-on initiated on the basis of user state monitoring.

In FIG. 19, the pending call setup is completed as in FIG. 17, then the call is disconnected, and then a subsequent userstate (Availabile) message is sent before the user is transitioned to Available and the notifications to the watchers are sent as in FIG. 18. Procedures with an inbound pended call are entirely analogous based on the called-party interactions in FIG. 17.

FIG. 20 describes how the system determines which call to establish when a user state transition takes place. As noted in the figure the user state change triggers a state processing script based on the mechanism of FIG. 9. At this point the server identifies all calls waiting for this user and state. Normal ranking of calls is based on the ordering of pended calls by calling and called user as expressed by the Call Status data entries (FIG. 7). Default behavior is to use the ranking by called user. If the call has not been ranked by the users or the normal ranking is inconclusive, then the ranking is by priority and order received. Finally, if corporate ranking is used, then the corporate priority (FIG. 7) can be used either directly or with a call evaluation object (managed by the Admin Client 103) that determines a corporate priority for the call. If that value is sufficiently high, then it overrides then normal ranking for selection of the call.

Figure 21:
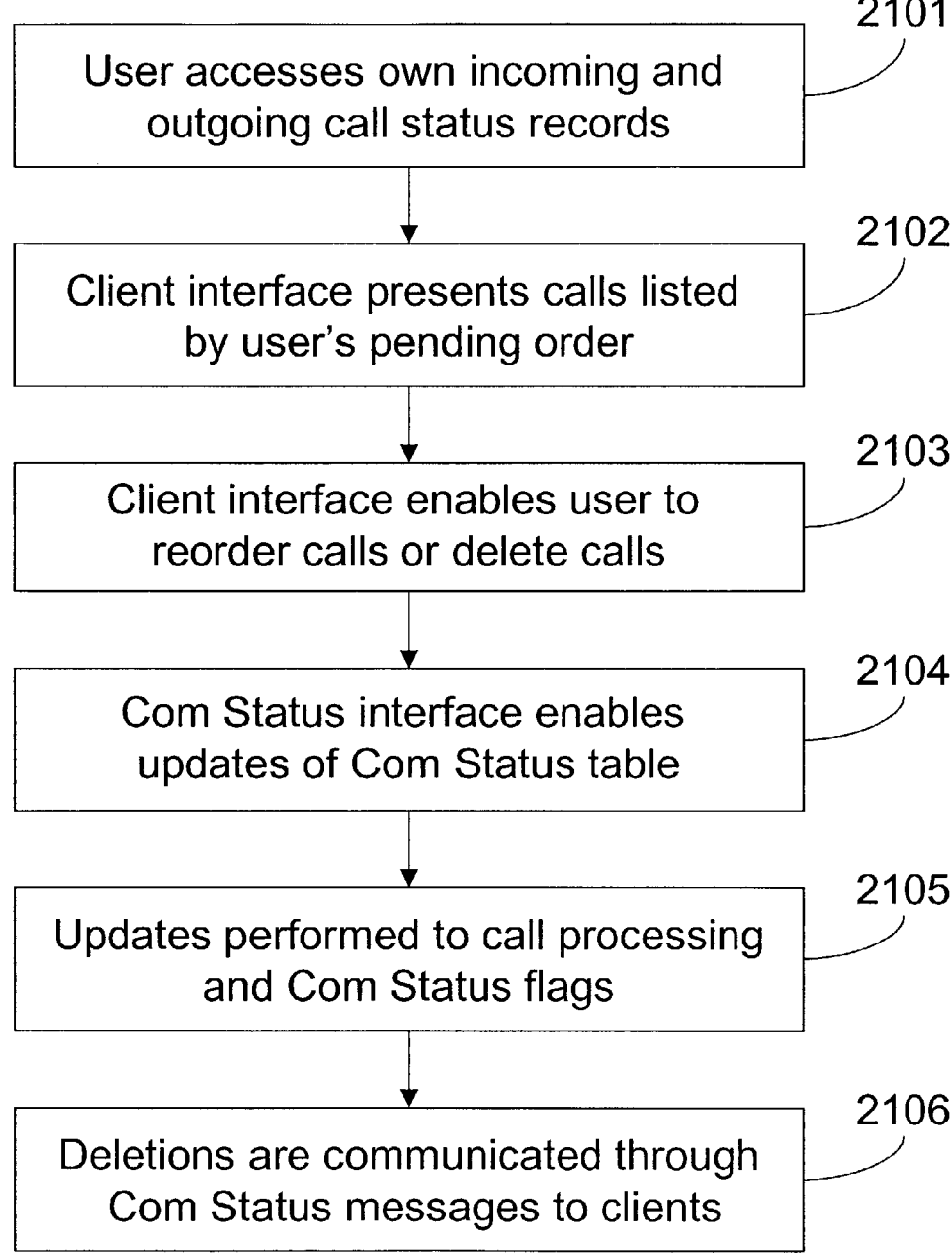
FIG. 21 is a diagram of pended call updating and deletion.

FIGS. 21 and 22 give the operational details for user management of pending communication using the Call Status interface structure of in FIG. 7. FIG. 21 gives the sequence of steps for pended call updating and deletion. The steps are as follows:

2101: The client queries the Call Status interface to get the current list of pended calls in the view accessed by the user.

2102: The client interface presents the items to the user. In the particular embodiment described the calls are listed according to the user's order value.

2103: The client interface enables the user to specify the update operations he wants to perform. As noted in the discussion of FIG. 12D, items can be dragged and dropped to specify priority order, and a delete button is used to delete the call.

2104: In the next step an update is performed on the Call Status interface, so that in the particular embodiment described the user's changes are performed on the Call Status table in the server database.

2105: When the changes are uploaded to call processing, the update flags for the modified table values are removed (see discussion of FIG. 8).

2106: Finally, within call processing the changes in the Call Status data entries cause Communications Status messages to be sent for appropriate events (e.g. deletes).

FIG. 22 shows how the Call Status interface can also function as an alternative to the server message interface in adding new pending communications items to the system.

As indicated, the user of this interface can define the details of the communication item using the fields of FIG. 5 as presented in the interface of FIG. 7. Once the record is inserted into the system database, it is treated as a normal pended call, with notification of clients by Communications Status messages, and execution based on pending for user states. The current status of any call is always reflected by its Call Status table status entry.

As will be noted in the discussion of alternative clients, this use of the Call Status interface to initiate communication is particularly adapted database or web-service oriented clients, such as web servers, Interactive Voice Response (IVR) systems, and CRM systems.

OTHER EMBODIMENTS

As noted at the beginning, the communications control system exploits knowledge of user state to deliver communications efficiency benefits in general business environments. It is independent of the specifics of the network and user interactions, as well as the specifics of the underlying technology of implementation.

The remaining figures describe options for use of the communications control system in other environments. These embodiments are implemented through alternative clients that access the functions of the CP Server through capabilities presented by the CP Server interfaces (e.g. setting state, requesting communications). Clients may access subsets of full functionality. For example a client may just set state for a user on one or more devices, or it may make a pending communication request for a call that will be established with a different device. Clients may also use the interface in something other than an end-user role (as in the multi-user role of the Web server and the third-party roles of the Workflow in FIG. 23).

From an implementation point of view these interfaces themselves can be packaged in a variety of ways, using the many methods that exist for applications to interwork with each other. For example, communications could be invoked and delivered via a local Component Object Model (COM) object as defined by Microsoft Corporation and state setting or the Call Status interface could be presented as XML Web Services as defined by the World Wide Web Consortium (W3C). Other alternatives include the Common Object Request Broker Architecture (Corba) from the Object Management Group, Enterprise Java Beans from Sun Microsystems, and many others. These implementation alternatives are evident to one skilled in the art. Similarly the call communication system is independent of the operating system or application execution environment of the clients.

FIG. 23 describes alternative forms of interaction with client users. There are five examples: Web server, Interactive Voice Response (IVR), Workflow, Softphone, Application-specific state sources. In the Web server example, a Web server functions as the system client and exports the user interactions to supported browsers. This can be a functional replacement for the User Client 102 of FIG. 12, which may or may not support the actual communications media on the user's browser application. Without media it can be used to set state and to initiate pended communications that may be delivered to other devices. The Web server can act on behalf of multiple users, so that a single Web server can enable a population of users to access the client functions. The Web server can also access the interfaces used by the Admin Client 103 to provide a Web-based alternative for configuration and/or operation of the CP Server.

An Interactive Voice Response system (IVR), for example the Conversant® system from Avaya Technology Corporation, enables automated telephone interaction with users using either speech recognition or telephone tones. This type of interface would typically be used to set state or initiate pended communications from a telephone with a dialed connection to the IVR system. IVR systems typically support both message-based and data-oriented computer interfacing and hence can be configured for interaction with the CP Server using either the Server Message Interface or the Call Status Interface.

The Workflow example represents a data processing application interfacing to the communications system. In this case the interacting client is the data processing application itself, for example a Customer Relationship Management (CRM) application such as Siebel Sales 7.5 from Siebel Systems, Inc., rather than a human user. A CRM application typically manages work activities and supporting data within a business. Using the Call Status interface, the Workflow application can direct the communication system in response to business project states. For example, it can place a pending call into the system to deal with a product delivery that has changed to the "delayed" state and adjust the priority order of communications for a specific task that has entered the "critical" state. In this example the Call Status interface is used in third-party form, with the Workflow client placing and adjusting communications items for human users. The Workflow client can also use the Server Message interface in a third-party way to set human user states depending on the project states associated work activities in the CRM system.

A Softphone is a desktop application that controls the operation of a user telephone device, typically on a PBX or ACD. An existing softphone application can be adapted to work with the CP Server and in this way can support management of pending calls in its own communication environment. In the PBX case this will normally include delivery of calls to existing PBX phones. A customized softphone adapted to the CP Server interfaces can integrate a customer business application with the tasks and priorities used by the call processing rules and can provide the data necessary for application collaboration between originating and terminating users.

Application-specific state sources refer to the many types of state information that may be useful to particular business applications. These state-sources can use the state-setting function from the CP-Server interface to affect states for users on devices. An example is Global Positioning System (GPS) location data. GPS data can be in a user state element for a delivery truck operator, so that a communication can be setup to discuss particular requirements of an area the truck operator is serving.

FIG. 24 gives examples of other communication networks supported by the communications control system. These can be viewed as replacement for the Microsoft RTC Media Interface in FIG. 12. Since the communications control system is concerned with the establishment of network connections, essentially any network can be used. This includes both traditional circuit-switched networks (such as the telephone network) and packet-switched networks (including IP networks such as the internet or a corporate intranet) in both wireline and wireless deployments. Also, essentially any of the telecommunications control interfaces can be used. Examples include the Telecommunications API (TAPI) from Microsoft and its Java version (JTAPI) from Sun Microsystems, the Computer Supported Telephony Applications (CSTA) standards of the European Computer Manufacturers Association (ECMA), as well as the manufacturers' CTI interfaces to PBX's and ACD's. Potential client communication devices can include Personal Digital Assistants (PDA's) and mobile phones with wireless data access (e.g. using the IEEE 802.11 standards) and the capability to add customized applications. With third-party control interfaces, such as the CSTA standards, the media can be delivered to existing phones. The communications control system can be used with any kind of communication, including voice, video, text-oriented communication such as Instant Messaging (already part of RTC), and non-real-time communication such as email.

FIG. 25 describes another type of networking option. In addition to the client networking options in FIG. 24, the communications control system supports interworking with media streams originated by external clients. In this way, users on the system can receive phone calls originated on the Public Switched Phone Network (PSTN), as well as messages and state events from Instant Messaging clients from America On-Line (AOL) and Microsoft. Further, pending calls can be delivered to ordinary phone lines and accepted by answering in the ordinary way. As another example, in SIP networks the routing servers (proxy or redirect) can receive both state and communications services messages, so the communications control system can become an added-value application for state-dependent routing in the environment of the SIP server. Architecturally, the interworking with these external media streams is provided by Interworking Clients. The structure and operation of these clients is given in FIGS. 26-30.

Figure 26:
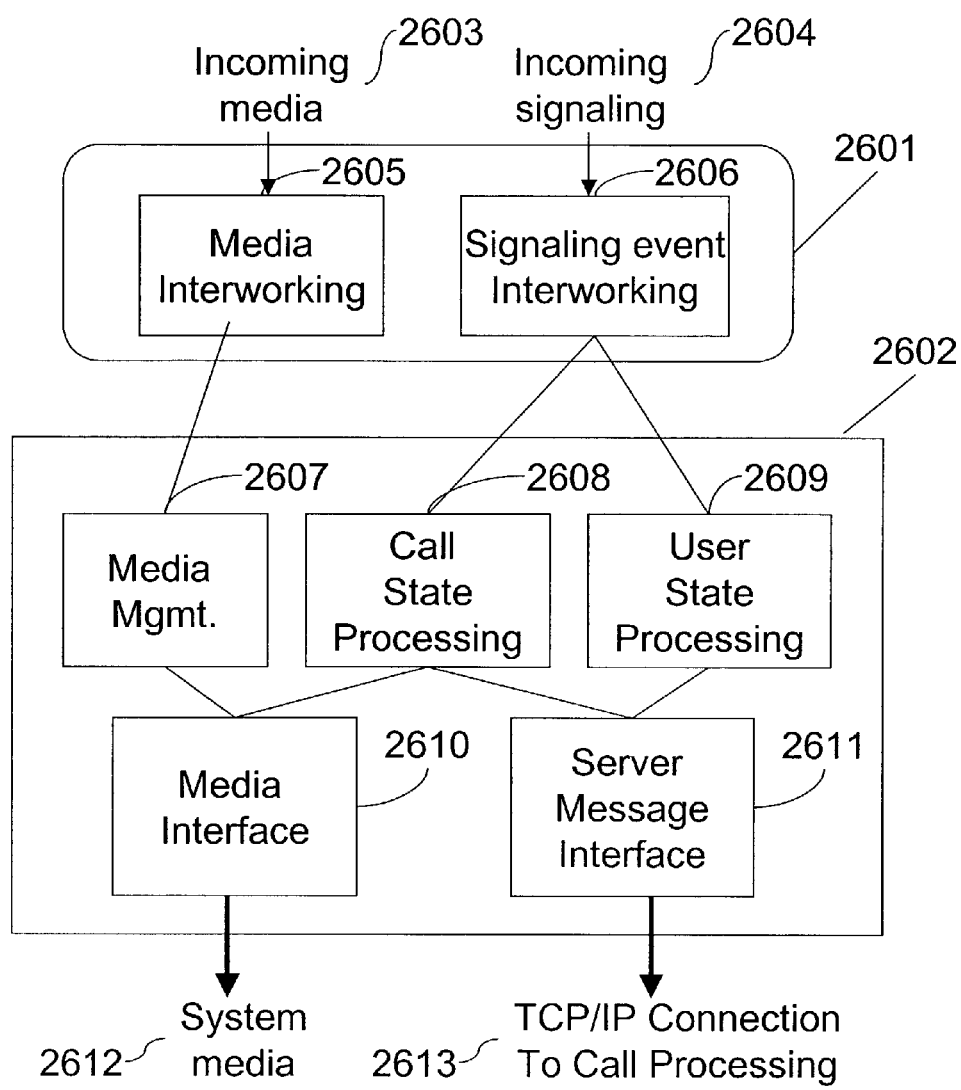
FIG. 26 is a diagram of an interworking client structure.

FIG. 26 is a structure diagram for an Interworking Client analogous to the structure diagram for the User Client 102 in FIG. 12. This shows that the Interworking Client is a simplified version of the User Client 102 focused on media and call and state control. The drawing is a functional subset of the elements of FIG. 12 with the exception of the interaction interface elements 2601, 2603–2606. In this client, the call and state inputs are provided by the interworking modules 2605 and 2606 that adapt the media and signaling inputs from the network 2603, 2604 to the basic connection and messaging events used by call and state processing. Interworking modules between signaling protocols are well-known in the art; for example see the PSTN/Internet Interworking (PINT) service specification (IETF Request for Comment #2848). For Instant Messaging, interworking between competing systems has been provided by companies such as FaceTime Communications.

The media portion of the Interworking Client (2603, 2605, 2607, 2610, 2612) may or may not be used in a specific client, depending up whether the media actually traverse the client or are redirected from the client using the capabilities of the signaling interface 2604. When the media passes through the client, then the operation of the system is quite simple: the call offering from the originating network is repeated on the terminating network, and once the call is accepted, both calls are answered and linked together through the media stream on the client. This works for calls that are either incoming and outgoing to the system. Redirection can be used as an alternative where the external communication is compatible with media control on the User Clients 102. In this case, an incoming call can be redirected from the Interworking Client to the target User Client 102. It is also possible that some media such as Instant Messaging text messages would traverse the client whereas other media such as voice would be redirected.

Figure 27:
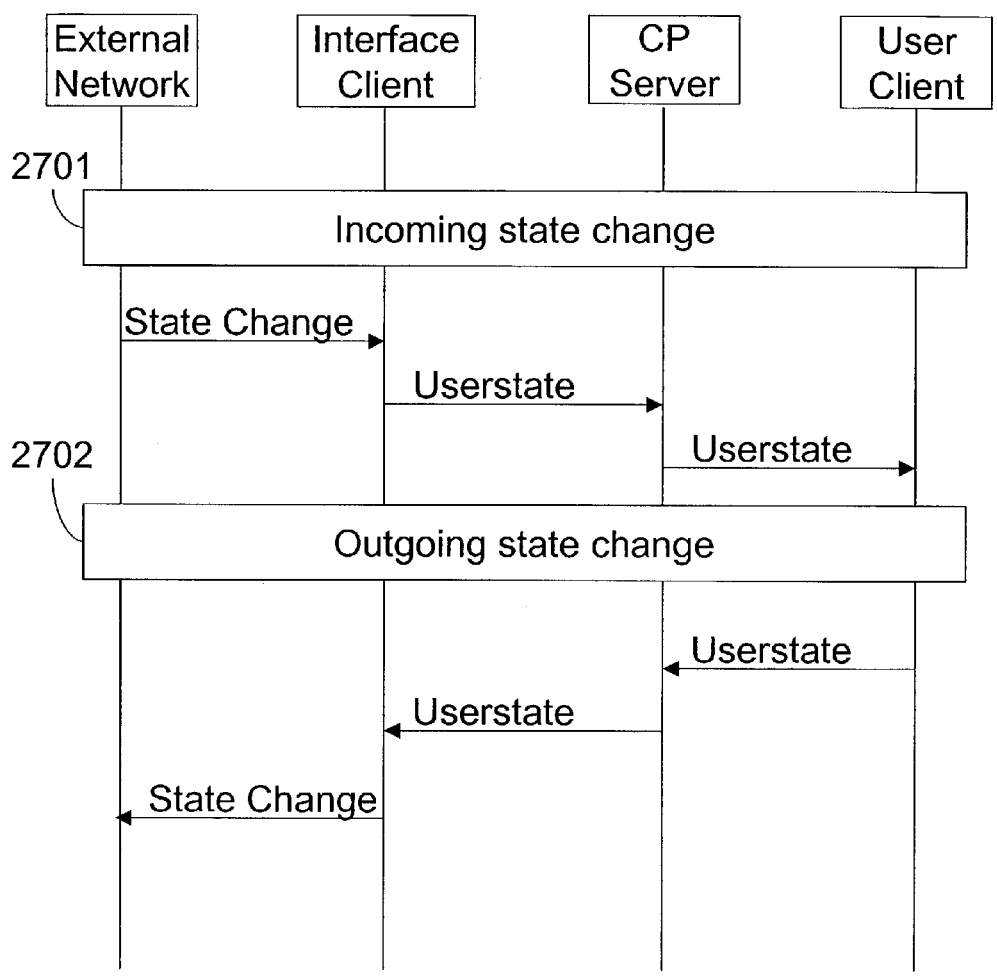
FIG. 27 is a diagram of networking interworking for state.
Figure 28:
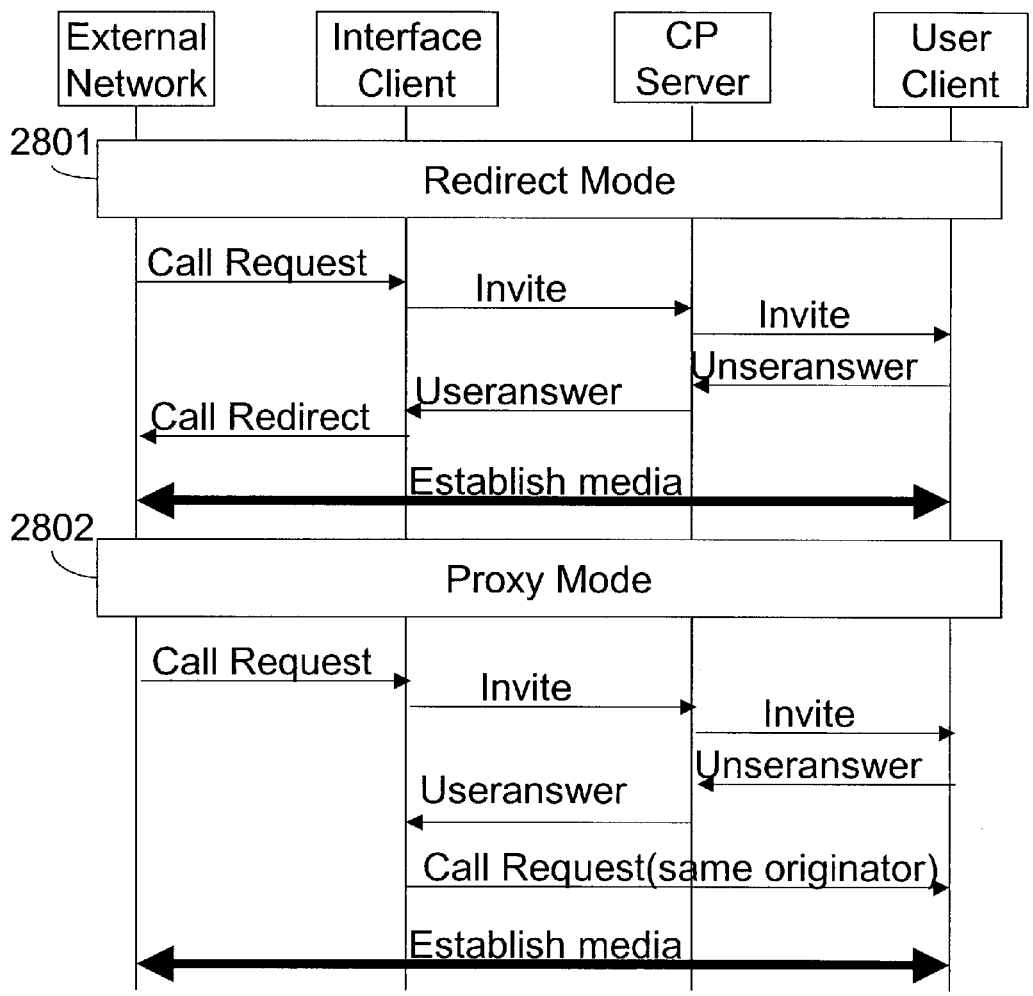
FIG. 28 is a diagram of network interworking for an incoming call.
Figure 29:
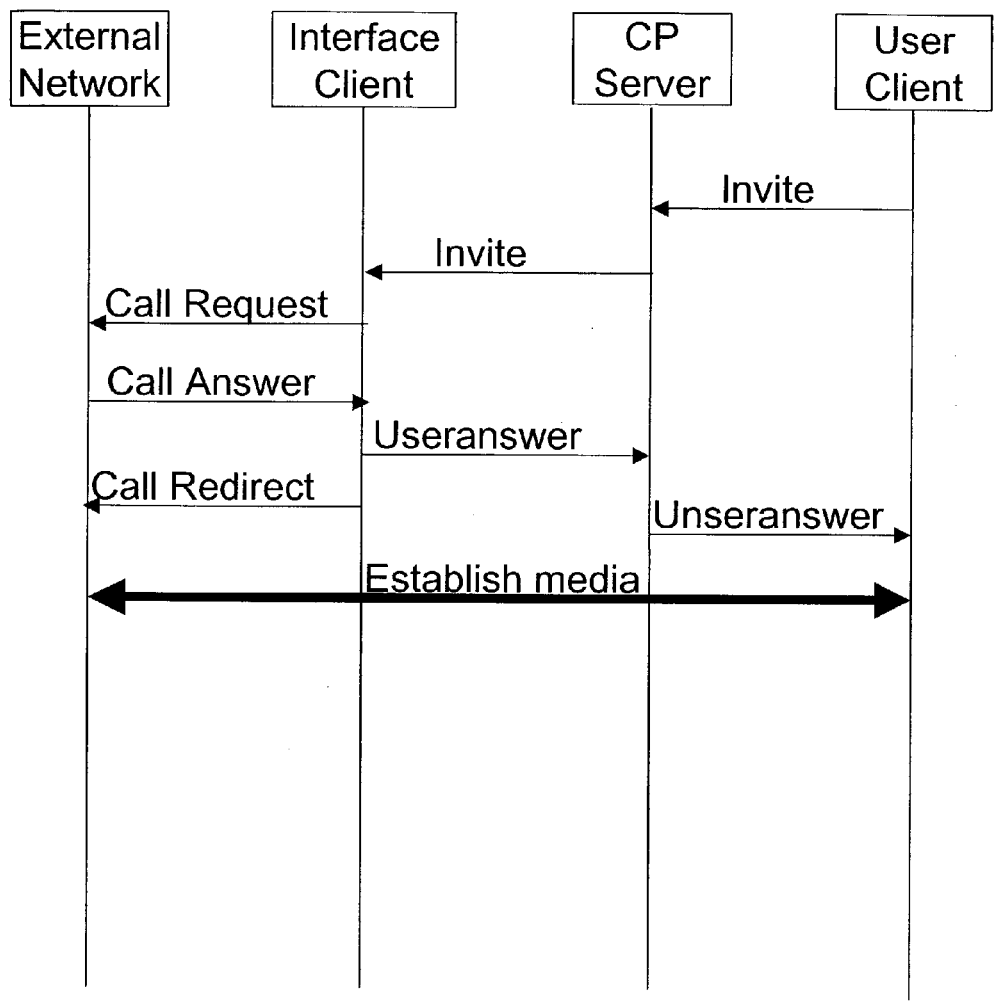
FIG. 29 is a diagram of network interworking for an outgoing call.

FIGS. 27–29 describe example message flows for the functional interworking with external networks. FIG. 27 shows a state change. In this case the interworking is straightforward, as the Interface Client translates the content of the external state change to an equivalent userstate message which is then passed on internally.

FIGS. 28 and 29 show connection establishment in the incoming and outgoing directions without media traversal of the Interworking Client. These are somewhat more complicated in that the signaling messages are passed out of band to establish the actual media connections. FIG. 28 shows two methods for handling incoming calls. In the first (redirect) case 2801 the incoming call request is turned into an incoming call setup as in FIG. 16. When the call is accepted by a device, a call redirect message is sent to the network to have the media established to the target device. The proxy case 2802 can be used when the network protocol allows the call request to be forwarded to a new potential termination. This is the case, for example, for a SIP network call that is received by a system with User Clients 102 in the particular embodiment described with Microsoft RTC. In this case, instead of using a redirect, the original call request is an Invite message that can be passed to the target device for media setup.

FIG. 29 shows an example of an outgoing call setup from a User Client 102 to the external network. In this case the call setup is forwarded to the Interface Client, which causes a setup to the external network. Once the call is answered, the media can be redirected via transfer to the initiating client in parallel with the Useranswer message, using the backward media setup option discussed for the particular embodiment described in association with FIG. 16.

Figure 30:
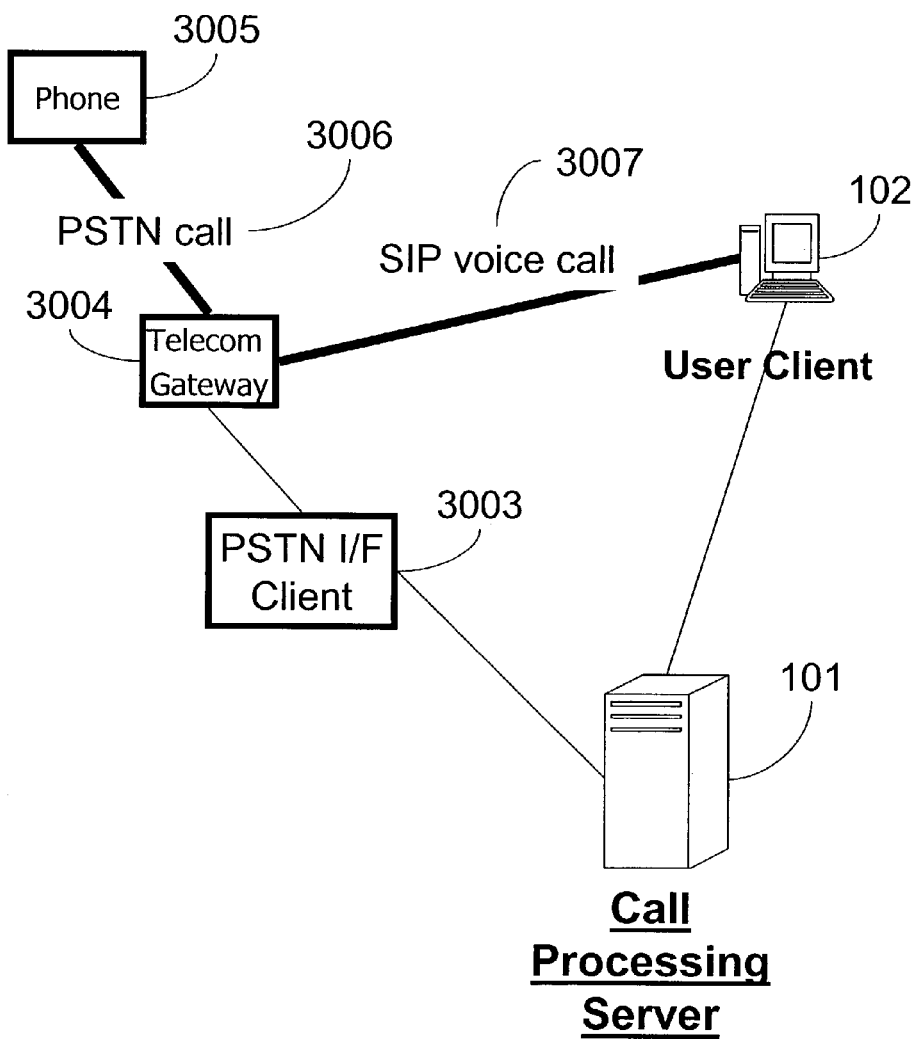
FIG. 30 is a diagram of network interworking for a public telephone network call.

FIG. 30 shows how this works for the special case for an ordinary telephone call arriving from the public switched telephone network (PSTN). In the figure the call from phone 3005 first arrives at a Telecom Gateway 3004 such as an Access Server 5350 from Cisco Systems. The Telecom Gateway then converts the telephone network call to a voice over IP call using SIP. The SIP call is then offered to the PSTN Interface Client 3003. As in the FIG. 28, the incoming call request is sent to the CP Server 3001 and thence to User Client 102. When the call is accepted by User Client 102, the Useranswer message propagates back to the Interface Client 3003 as in either mode 2801 or 2802 of FIG. 28. Since the SIP protocol supports redirect and is consistent with the media interface of the User Client in the particular embodiment described, the communication media path (indicated by the heavy lines from 3004 to 3005 for the PSTN call 3006 and from 3005 to 3002 for the SIP voice call 3007) does not need to pass through the PSTN Interface Client 3003. In fact, the SIP protocol supports both the redirect and proxy modes from FIG. 28, and the call from the Telecom Gateway can be redirected to the User Client 102 and received there.

Figure 31:
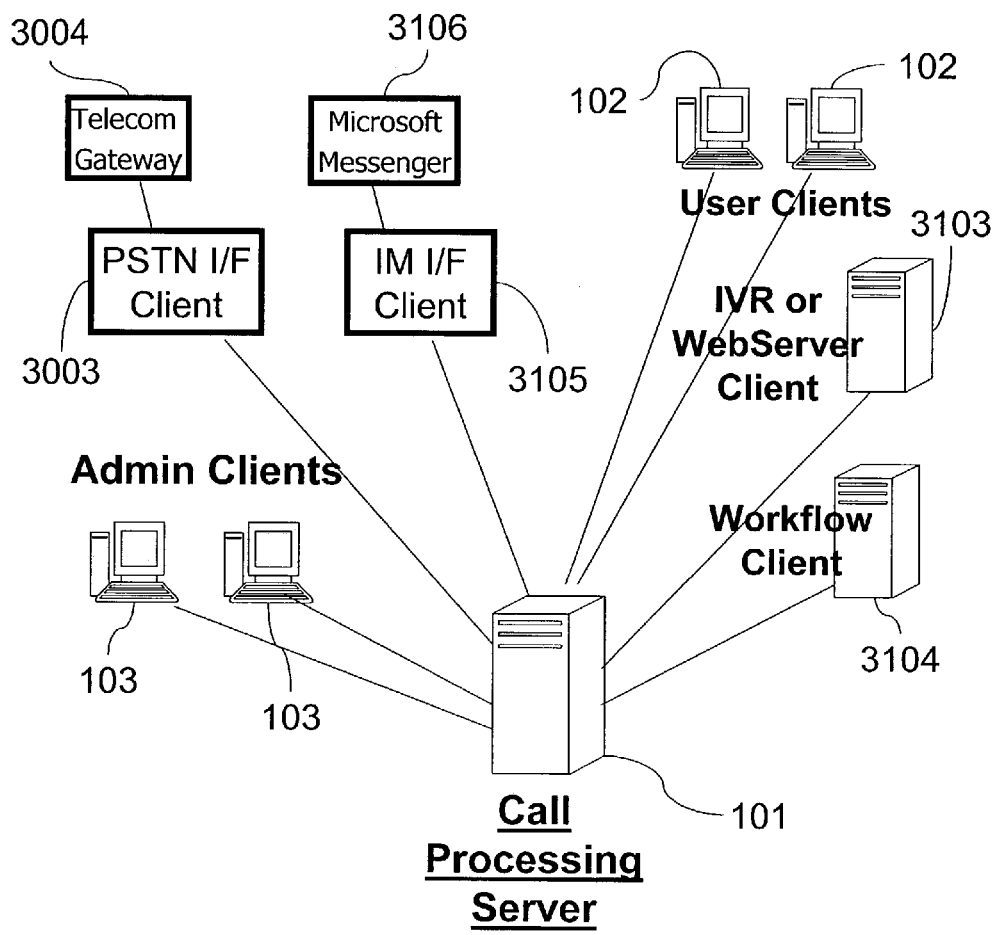
FIG. 31 is an expanded system diagram.

FIG. 31 is an expanded system diagram giving an indication of the scope of the system with the alternative clients we have just discussed. In addition to the User Clients 102 from FIG. 1 there are two clients with other interaction interfaces, namely a Web Server or IVR client 3103 and a Workflow client 3104 from FIG. 23. There are also two interface clients, one for the PSTN using a PSTN Interface Client 3003 and a Telecom Gateway 3004 as just discussed in FIG. 30 and another IM Interface Client 3105 for a Microsoft Messenger instance 3106 as discussed in association with FIG. 26. Users can now access this system with ordinary User Clients 102, over the Web, via Instant Messaging, and with ordinary phones. They can set state by whatever means is appropriate to their access method and benefit from the communication management features of the communication control system.

Figure 32:
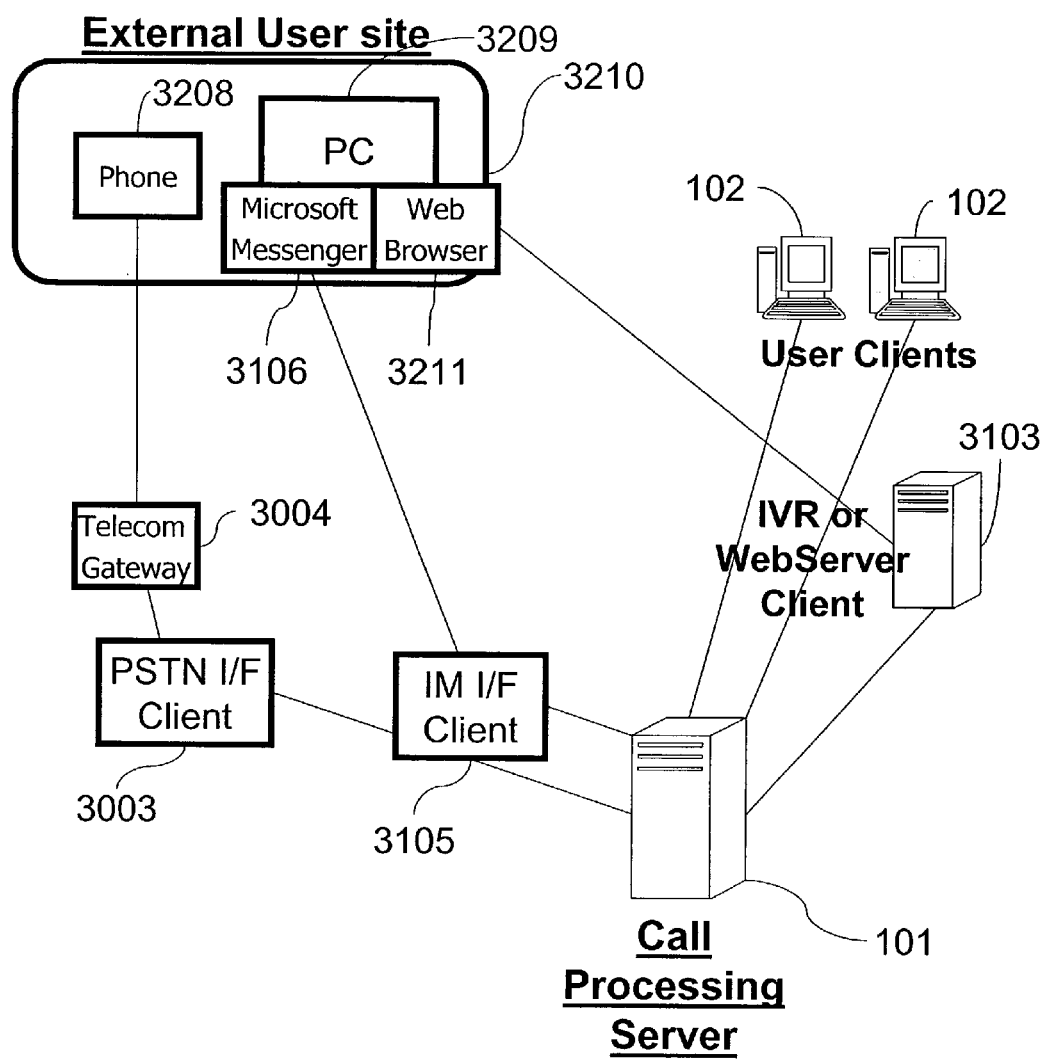
FIG. 32 is a diagram of an external user example.
Figure 33:
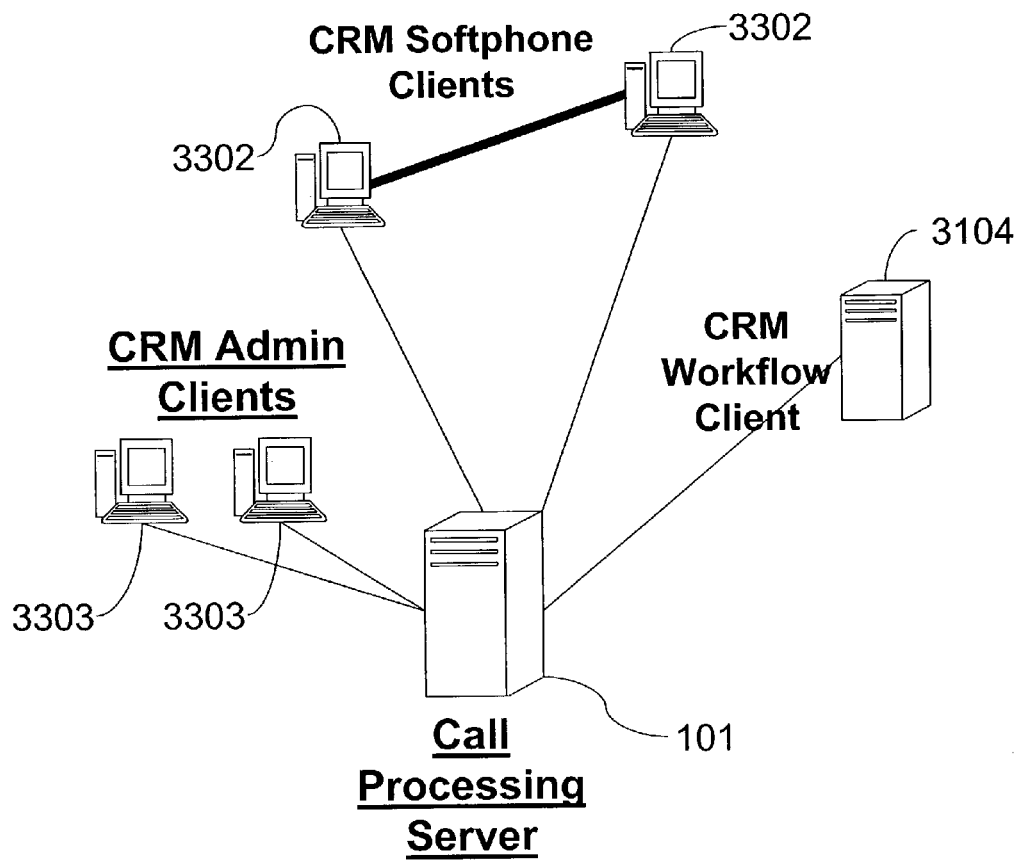
FIG. 33 is a diagram of a business application example.

FIGS. 32 and 33 give examples of what this can mean. FIG. 32 describes the features available to an example user who would normally be considered to be outside the system. This user is at an external location 3210 and has no direct connection either to the media supported by the User Clients 102 or to the CP Server 101 itself. What the user does have is a phone 3208 and a PC 3209 with an Internet browser 3211 and an Instant Messaging client 3106. With this arrangement, the user's state can be derived first of all from the user state on the Instant Messaging client 3106, which the CP Server can be configured to recognize as the state of the user on the phone 3208 as well. As an alternative or complement the user can also explicitly set elements of his state using the Web Server client 3103. He can receive pending communications that are established subject to his state using either his phone 3208 or the Instant Messaging client 3106. Using the web browser 3211 he can establish calls with context into the system and have them show up on pending call lists for himself via the browser 3211 and for associated internal users. Both he and the internal users can manage those calls according to individual and/or corporate priorities and have detailed records of the entire transaction. Hence even though this user would traditionally have been considered outside the system, both he and his internal contacts can manage their interactions through the capabilities provided by the communications control system.

Viewed somewhat differently this example also describes a new kind of contact system linking an external caller and the company he is calling. With the web interface 3211 the external caller can register a request to communicate when he is available, and he can provide his state either using the web 3211 or by specifying an Instant Messaging client 3106 whose state should be used. Since the call will be established based on the caller's state, there is a potential to avoid waiting on hold. In addition, from the point of view of the receiving company, there is a possibility to enhance service by enabling particular employees to work with particular outside clients, something that is awkward and inefficient with traditional ACD technology.

FIG. 33 describes the integration of the communications control system with a business customer application such as a CRM system. In the figure the integration takes places in three areas. First the Workflow client 3104 enables the CRM system to integrate with the communication application as a user. In this way the CRM system can initiate pending communications and manage communication priorities and user availability based upon business project states reflecting the needs of the business application. Second the figure shows CRM customized softphones 3302. These clients are directly controlled by the users and can initiate communications with call context derived from the business application, including priorities and task references, and can assure that the communication context contains the information necessary for application collaboration between originating and terminating users. Also, the entire state mechanism for the users can reflect the needs of the business environment by using customized, independent states as described in FIG. 2. Finally, the figure shows a CRM-customized version of the Admin Client 3303 that presents the capabilities of configuration control interface used by the Admin Client 103 in the user interface environment of the CRM application. As has been noted earlier, the entire configuration of call processing is managed in a transparent way by database interfaces, so that a customized Admin Client can be built as another database client interface within the CRM.

It should be noted that with the three clients in FIG. 33, the CRM system has actually fused with the communication system, to point where there is now one system that merges the business and communications management and control for the benefit of both the individual users and the business as a whole.

What is claimed is:

1. A system for establishing communications between users comprising
one or more communication devices for each said user, and
a controller that
monitors the states of said users,
receives communication requests for the establishment of a communication between two or more said users,
establishes a requested communication among two or more said users when said two or more said users are each in an appropriate state for participating in said communication,
maintains waiting communications data associated with communication requests waiting to be established, referred to as waiting communications,
sends a waiting communication notification with information about an addition, deletion, or change to the waiting communications or other change to the waiting communications data to at least one party that did not request the addition, deletion or change,
responds to a waiting communication management request from a recipient of a waiting communications notification by modifying the waiting communications data; and
responds to a change of state for a user by selecting at most one waiting communication that can be established because the corresponding users are each in an appropriate state for participating in the communication, said selecting based on the current waiting communications data.

2. A system for establishing communications between users comprising
one or more communication devices for each said user, and
a controller that
monitors the states of users,
receives communication requests for the establishment of a communication between two or more said users,
enables one of said users to set conditions under which communications are to be established with said user,
establishes a requested communication among two or more said users according to said conditions set by said users and when said two or more said users are each in an appropriate state for participating in said communication, maintains waiting communications data associated with communication requests waiting to be established, referred to as waiting communications, sends a waiting communication notification with information about an addition, deletion, or change to the waiting communications or other change to the waiting communications data to at least one party that did not request the addition, deletion or change, responds to a waiting communication management request from a recipient of a waiting communications notification by modifying the waiting communications data; and responds to a change of state for a user by selecting at most one waiting communication that can be established because the corresponding users are each in an appropriate state for participating in the communication, said selecting based on the current waiting communications data.

3. A system for establishing communications between users comprising one or more communication devices for each said user, and a controller that monitors the states of said users, receives communication requests for the establishment of a communication between two or more said users, receives conditions under which communications are to be established among said users from a system administrator, establishes a requested communication among two or more said users according to said conditions set by said administrator and said two or more said users are each in an appropriate state for participating in said communication, maintains waiting communications data associated with communication requests waiting to be established, referred to as waiting communications, sends a waiting communication notification with information about an addition, deletion, or change to the waiting communications or other change to the waiting communications data to at least one party that did not request the addition, deletion or change, responds to a waiting communication management request from a recipient of a waiting communications notification by modifying the waiting communications data; and responds to a change of state for a user by selecting at most one waiting communication that can be established because the corresponding users are each in an appropriate state for participating in the communication, said selecting based on the current waiting communications data.

4. A system for establishing communications between users involved in a project comprising one or more communication devices for each said user, and a controller that monitors the states of said users and project states relating to said project, receives communication requests for the establishment of a communication between two or more said users, establishes a requested communication among two or more said users based upon the state of at least one said user and said project states, maintains waiting communications data associated with communication requests waiting to be established, referred to as waiting communications, sends a waiting communication notification with information about an addition, deletion, or change to the waiting communications or other change to the waiting communications data to at least one party that did not request the addition, deletion or change, responds to a waiting communication management request from a recipient of a waiting communications notification by modifying the waiting communications data; and responds to a change of state for a user by selecting at most one waiting communication that can be established based upon the state of at least one said user and said project states, said selecting based on the current waiting communications data.

5. A system for establishing communications between users comprising one or more communication devices for each said user, at least some said users having more than one said communication device, and a controller that monitors the states of said users on their communication devices, receives communication requests for the establishment of a communication between two or more said users, establishes a requested communication when said two or more said users are each in an appropriate state on an appropriate device for participating in said communication, maintains waiting communications data associated with communication requests waiting to be established, referred to as waiting communications, sends a waiting communication notification with information about an addition, deletion, or change to the waiting communications or other change to the waiting communications data to at least one party that did not request the addition, deletion or change, responds to a waiting communication management request from a recipient of a waiting communications notification by modifying the waiting communications data; and responds to a change of state for a user by selecting at most one waiting communication that can be established because the corresponding users are each in an appropriate state on an appropriate device for participating in the communication, said selecting based on the current waiting communications data.

6. A system to establish communications between users comprising one or more communication devices for each said user, one or more communication requesters, each said communication requester able to request the establishment of a communication for a requesting user with one or more additional users, a controller that monitors the states of said users, receives communication requests for the establishment of a communication from said communication requesters, establishes a requested communication between said requesting user and said additional users when said requesting user is in an appropriate state, maintains waiting communications data associated with communication requests waiting to be established, referred to as waiting communications, sends a waiting communication notification with information about an addition, deletion, or change to the waiting communications or other change to the waiting communications data to at least one party that did not request the addition, deletion or change, responds to a waiting communication management request from a recipient of a waiting communications notification by modifying the waiting communications data; and responds to a change of state for a requesting user by selecting at most one waiting communication that can be established because the requesting user is in an appropriate state for participating in the communication, said selecting based on the current waiting communications data.

7. The system of claim 1 wherein one of said requests for the establishment of a communication includes specification of an appropriate state for one of said users to participate in the communication.

8. The system of claim 1 wherein said controller monitors the states of said users by receiving state change messages requesting or indicating a change in the state of said users.

9. The system of claim 1 wherein said controller monitors the states of said users by polling for state data for said users.

10. The system of claim 1 wherein said communication requests can be originated by users.

11. The system of claim 1 wherein said communications requests can be originated by parties who are not users.

12. The system claim 1 wherein the states of said users include an Available state in which a user is willing to communicate with another user.

13. The system of claim 12 wherein a user can be in the Available state independent of whether said user is currently communicating with another user.

14. The system of claim 1 wherein the states of said users include a state that is independent of whether the user is currently communicating with another user.

15. The system of claim 14 wherein a user can be in the Available state independent of whether said user is currently communicating with another user.

16. The system of claim 1 wherein said waiting communications notification is sent automatically to a recipient.

17. The system of claim 1 wherein said waiting communications notification is sent in response to a request from a recipient.

18. The system of claim 1 wherein said recipient of a waiting communications notification is a user.

19. The system of claim 1 wherein said recipient of a waiting communications notification is a person who is not a user.

20. The system of claim 1 wherein said recipient of a waiting communications notification is a computer application.

21. The system of claim 20 wherein said recipient of a waiting communications notification is a Customer Relationship Management system.

22. The system of claim 1 wherein said recipient receives the waiting communications notification directly from said controller.

23. The system of claim 1 wherein said controller receives the waiting communications management request directly from said recipient.

24. The system of claim 1 wherein said recipient receives the waiting communications notification from another party based on a waiting communications notification received directly from said controller.

25. The system of claim 1 wherein said controller receives the waiting communications management request from another party based on a waiting communications management request received directly from said recipient.

26. The system of claim 1 wherein the waiting communications notification provides the length of time a communication request has spent waiting to be established.

27. The system of claim 1 wherein said modifying includes a deletion of a communication request that is waiting to be established.

28. The system of claim 1 wherein said modifying includes a change to a communication request that is waiting to be established.

29. The system of claim 28 wherein said change includes a change to one or more of the users in the communication request.

30. The system of claim 28 wherein said change includes a change to the appropriate state for a user to participate in a communication.

31. The system of claim 28 wherein said change includes a change to the media or the subject of the communication request.

32. The system of claim 1 wherein said modifying deactivates a communication request, so that it cannot be chosen by said selecting, or activates a deactivated communication request so that it can be chosen.

33. The system of claim 1 wherein said modifying sets a corporate priority order among the communication requests waiting to be established, and said selecting is responsive to the corporate priority order to determine the order in which communications are established.

34. The system of claim 33 wherein only some parties and not others are permitted to set a corporate priority order.

35. The system of claim 1 wherein said recipient is a user and said modifying only involves communication requests for said user.

36. The system of claim 35 wherein said modifying sets a user priority order for call requests involving the user, and said selecting is responsive to said user priority order to determine the order in which communications are established for the user.

37. The system of claim 1 wherein said controller further receives a user state change request from a user and responds to the user state change request by sending user state information indicating the requested change of state has occurred for the user.

38. The system of claim 37 wherein said controller responds to the change of state request from the user by establishing a communication instead of indicating the requested change of state has occurred for the user.

39. The system of claim 1 wherein the controller includes a reporting interface that provides historical information on the handling of communication requests by the system and said historical information provides the duration of the waiting time before a requested communication was established.

40. The system of claim 1 wherein the controller includes an administrative interface and the logic for selecting can be modified by said administrative interface.

41. The system of claim 1 wherein logic for selecting is specified by logical links between basic operations and the links and basic operations are defined in a database.

42. The system of claim 1 wherein said communication is a real-time communication medium such as voice.

43. The system of claim 1 wherein said communication is a non-real-time communication medium such as email.

44. The system of claim 1 wherein said communication involves an Instant Messaging system.

45. The system of claim 1 wherein said communication involves the Public Switched Telephone network.

46. The system of claim 1 wherein the state of a user is monitored using an Instant Messaging system, a CRM system, a SIP network, or a GPS system.

47. The system of claim 1 wherein the state of a user is monitored using a Web server or a Web service.

48. The system of claim 2 wherein said conditions are set by modifying said waiting communications data.

49. The system of claim 2 wherein said conditions are set by specifying selection logic for said selecting.

50. The system of claim 47 wherein said selection logic is defined by user-editable scripts.

51. The system of claim 2 wherein said conditions are set by specifying priorities for callers or caller attributes to be used by said selecting.

52. The system of claim 3 wherein said administrative conditions are set by modifying said waiting communications data.

53. The system of claim 3 wherein said administrative conditions are set by specifying selection logic for said selecting.

54. The system of claim 53 wherein said selection logic is defined by administrative scripts.

55. The system of claim 3 wherein said administrative conditions are set by specifying priorities for organizations to be used by said selecting.

56. The system of claim 3 wherein said administrator is a user.

57. The system of claim 3 wherein said administrator is not a user.

58. The system of claim 4 wherein said controller responds to a change in project state by initiating a communication request.

59. The system of claim 4 wherein said controller responds to a change in project state by setting a corporate priority for a communication request, where said corporate priority is used by said selecting to determine the order in which communications are established.

60. The system of claim 4 wherein said controller responds to a change in project state by changing the state of a user.

61. The system of claim 4 wherein said controller establishes said requested communication based upon the states of said two or more said users and said project states.

62. The system of claim 4 wherein said controller responds to a change in project state by deleting a communication request that is waiting to be established.

63. The system of claim 4 wherein said controller responds to a change in project state by modifying a communication request that is waiting to be established.

64. The system of claim 63 wherein said controller responds to a change in project state by changing the users involved in a communication request that is waiting to be established.

65. The system of claim 63 wherein said controller responds to a change in project state by changing an appropriate state for a user to participate in a communication.

66. The system of claim 63 wherein said controller responds to a change in project state by changing the media or the subject of a communication request.

67. The system of claim 4 wherein said controller responds to a change in project state by deactivating a communication request, so that it cannot be chosen by said selecting, or by activating a deactivated communication request so that it can be chosen.

68. The system of claim 4 wherein said controller responds to a change in project state by modifying the waiting communications data.

69. The system of claim 5 wherein said selecting further includes device selection logic to determine which user devices are appropriate for said requested communication and said device selection logic depends on the states of at least one of said two or more said users on their devices.

70. The system of claim 6 wherein the waiting communications notification provides the length of time a communication request has spent waiting to be established.

71. The system of claim 6 wherein said modifying includes a deletion of a communication request that is waiting to be established.

72. The system of claim 6 wherein said modifying includes a change to a communication request that is waiting to be established.

73. The system of claim 72 wherein said change includes a change to one or more of the users in the communication request.

74. The system of claim 72 wherein said change includes a change to the appropriate state for the requesting user to participate in a communication.

75. The system of claim 72 wherein said change includes a change to the media or the subject of the communication request.

76. The system of claim 6 wherein said modifying deactivates a communication request, so that it cannot be chosen by said selecting, or activates a deactivated communication request so that it can be chosen.

77. The system of claim 6 wherein said modifying sets a corporate priority order among the communication requests waiting to be established, and said selecting is responsive to the corporate priority order to determine the order in which communications are established.

78. The system of claim 6 wherein said requests for the establishment of communication include specification of said appropriate state for the requesting user.

79. The system of claim 6 wherein said waiting communication notification provides historical information on the handling of communication requests by the system and said historical information provides the duration of the pending time before a requested communication was established.

80. The system of claim 6 wherein the states of the requesting user include a state that is independent of whether the user is currently communicating with another user.

* * * * *